US00RE50809E

(19) United States
(12) Reissued Patent
Beyer

(10) Patent Number: US RE50,809 E
(45) Date of Reissued Patent: Mar. 3, 2026

(54) METHOD OF MODIFYING A SOLID USING LASER LIGHT

(71) Applicant: Siltectra GmbH, Dresden (DE)

(72) Inventor: Christian Beyer, Freiberg (DE)

(73) Assignee: Siltectra GmbH, Dresden (DE)

(21) Appl. No.: 18/322,982

(22) Filed: May 24, 2023

Related U.S. Patent Documents

Reissue of:
(64) Patent No.: 11,014,199
Issued: May 25, 2021
Appl. No.: 16/863,505
Filed: Apr. 30, 2020

U.S. Applications:
(63) Continuation of application No. 16/591,693, filed on Oct. 3, 2019, now Pat. No. 10,661,392, which is a
(Continued)

(30) Foreign Application Priority Data

Jan. 15, 2015 (DE) ..... 102015000449

(51) Int. Cl.
*B23K 26/53* (2014.01)
*B23K 26/0622* (2014.01)
*B23K 103/00* (2006.01)

(52) U.S. Cl.
CPC ..... *B23K 26/53* (2015.10); *B23K 26/0624* (2015.10); *B23K 2103/56* (2018.08)

(58) Field of Classification Search
CPC . B23K 26/53; B23K 26/0624; B23K 2103/56
See application file for complete search history.

(56) References Cited

U.S. PATENT DOCUMENTS 3,629,545 A 12/1971 Graham et al.
4,546,231 A 10/1985 Gresser et al.
(Continued)

FOREIGN PATENT DOCUMENTS

CN 102325717 A 1/2012
CN 102664221 A 9/2012
(Continued)

OTHER PUBLICATIONS

Editors of the American Heritage Dictionaries (Ed.). (2016). Density. In The American Heritage(R) Dictionary of the English Language (6th ed.). Houghton Mifflin. https://search.credoreference.com/articles/Qm9va0FydGljbGU6NDQwNDY2NA==?aid=279753 (Year: 2016).*

(Continued)

*Primary Examiner* — Christina Y. Leung
(74) *Attorney, Agent, or Firm* — Murphy, Bilak & Homiller, PLLC

(57) ABSTRACT

The invention relates to a method for creating a detachment zone (2) in a solid (1) in order to detach a solid portion (12), especially a solid layer (12), from the solid (1), said solid portion (12) that is to be detached being thinner than the solid from which the solid portion (12) has been removed. The method according to the invention preferably comprises at least the steps of: providing a solid (1) which is to be processed and which is made of a chemical compound; providing a LASER light source; and subjecting the solid (1) to LASER radiation from the LASER light source so that the laser beams penetrate into the solid (1) via a surface (5) of the solid portion (12) that is to be cut off; the LASER radiation controlling the temperature of a predefined portion of the solid (1) inside the solid (1) in a defined manner such that a detachment zone (2) or a plurality of partial detachment zones (25, 27, 28, 29) is formed; characterized in that the temperature produced by the laser beams in a predefined portion of the solid (1) is so high that the material forming the predefined portion is subject to modifications (9) in the form of a predetermined conversion of material.

46 Claims, 13 Drawing Sheets

Related U.S. Application Data continuation of application No. 15/544,014, filed as application No. PCT/EP2015/077979 on Nov. 27, 2015, now abandoned.

(56) References Cited

U.S. PATENT DOCUMENTS

| | | | | |
|---|---|---|---|---|
| 5,374,564 | A | 12/1994 | Bruel | |
| 5,714,306 | A | 2/1998 | Komatsu et al. | |
| 5,756,061 | A * | 5/1998 | White | C01B 32/26 423/446 |
| 5,968,382 | A | 10/1999 | Matsumoto et al. | |
| 5,968,383 | A | 10/1999 | Yamazaki et al. | |
| 7,727,790 | B2 | 6/2010 | Zimmerman et al. | |
| 8,432,021 | B2 | 4/2013 | Moriwaka | |
| 8,466,074 | B2 | 6/2013 | Cho et al. | |
| 8,835,802 | B2 | 9/2014 | Baer | |
| 10,661,392 | B2 * | 5/2020 | Beyer | B23K 26/0624 |
| 11,527,441 | B2 | 12/2022 | Beyer et al. | |
| 2002/0190435 | A1 | 12/2002 | Obrien et al. | |
| 2004/0171232 | A1 | 9/2004 | Cayrefourcq et al. | |
| 2004/0229444 | A1 | 11/2004 | Couillard et al. | |
| 2005/0048738 | A1 | 3/2005 | Shaheen et al. | |
| 2006/0240275 | A1 | 10/2006 | Gadkaree | |
| 2007/0298529 | A1 | 12/2007 | Maeda et al. | |
| 2009/0056513 | A1 | 3/2009 | Baer | |
| 2009/0302428 | A1 | 12/2009 | Sakamoto et al. | |
| 2010/0289189 | A1 | 11/2010 | Lichtensteiger et al. | |
| 2011/0132549 | A1 | 6/2011 | Sercel et al. | |
| 2012/0061356 | A1 | 3/2012 | Fukumitsu | |
| 2012/0255935 | A1 | 10/2012 | Kakui et al. | |
| 2013/0126573 | A1 | 5/2013 | Hosseini et al. | |
| 2013/0312460 | A1 * | 11/2013 | Kunishi | H01L 21/268 65/112 |
| 2014/0001679 | A1 | 1/2014 | Okuma et al. | |
| 2014/0038392 | A1 * | 2/2014 | Yonehara | B81C 1/0038 438/463 |
| 2014/0197419 | A1 | 7/2014 | Henley et al. | |
| 2014/0199519 | A1 | 7/2014 | Schillinger et al. | |
| 2016/0254232 | A1 | 9/2016 | Drescher et al. | |
| 2020/0051831 | A1 | 2/2020 | Beyer et al. | |
| 2020/0262008 | A1 | 8/2020 | Beyer | |

FOREIGN PATENT DOCUMENTS

| | | | |
|---|---|---|---|
| CN | 202655797 | U | 1/2013 |
| CN | 103380482 | A | 10/2013 |
| CN | 103380842 | A | 11/2013 |
| CN | 103459082 | A | 12/2013 |
| CN | 103703552 | A | 4/2014 |
| DE | 102010030358 | A1 | 12/2011 |
| DE | 102013007672 | A1 | 11/2014 |
| EP | 2346066 | A1 | 7/2011 |
| EP | 2665090 | A1 | 11/2013 |
| EP | 2754524 | A1 | 7/2014 |
| JP | H0929472 | A | 2/1997 |
| JP | 2011152561 | A | 8/2011 |
| JP | 2011155069 | A | 8/2011 |
| JP | 2011240363 | A | 12/2011 |
| JP | 2012169361 | A | 9/2012 |
| JP | 2013046924 | A | 3/2013 |
| JP | 2013049161 | A | 3/2013 |
| JP | 2013141701 | A | 7/2013 |
| JP | 2013158778 | A | 8/2013 |
| JP | 2013161976 | A | 8/2013 |
| JP | 2015074004 | A | 4/2015 |
| KR | 20080010437 | A | 1/2008 |
| KR | 20100070159 | A | 6/2010 |
| KR | 20120047786 | A | 5/2012 |
| KR | 20180059569 | A1 | 6/2018 |
| WO | 2008033508 | A2 | 3/2008 |
| WO | 2012074439 | A2 | 6/2012 |
| WO | 2012108052 | A1 | 8/2012 |
| WO | 2012108056 | A1 | 8/2012 |
| WO | 2013009222 | A1 | 1/2013 |
| WO | 2013115352 | A1 | 8/2013 |
| WO | 2013115353 | A1 | 8/2013 |
| WO | 2013126927 | A2 | 8/2013 |
| WO | 2014156688 | A1 | 10/2014 |
| WO | 2016083610 | A2 | 6/2016 |

OTHER PUBLICATIONS

"Heat Treatment Equipment", Professional Group of Shanghai Society of Mechanical Engineering, Shanghai Science and Technology, Jul. 31, 1963, 1-27.

Zhao, et al., "Superhard and tougher SiC/diamond-like-carbon composite films produced by electron beam physical vapour deposition", Science Direct, Acta Mateiialia 51, 2009, pp. 893-902.

* cited by examiner 40
4
5
9
11
5
501

40
9
112
502
503

40
9
113
504
505

METHOD OF MODIFYING A SOLID USING LASER LIGHT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

According to claim 1, the invention at hand relates to a method for creating a detachment zone in a solid in order to detach a solid portion from the solid and, according to claim 13, to a method for detaching at least one solid portion from a solid.

The splitting of solids, in particular of wafers, is classically effected by means of sawing. This splitting method, however, has a plurality of disadvantages. For instance, chips are always created during sawing, which thus represent destroyed basic material. The thickness fluctuation of the sawed-off disks further also increases when the sawing height increases. In addition, the sawing element has the effect that grooves and surface damages are created on the surfaces of the disks, which are to be separated from one another.

It can thus be seen that the splitting method "sawing" involves very high material costs and costs for the reworking.

Publication WO 2013/126927 A2 further discloses a method for cutting off device layers from an original wafer. According to WO 2013/126927 A2, the overall arrangement is thereby heated up very strongly as a result of a laser application. This heating is required in order to reach stresses in the interior of the solid via the different heat expansion coefficients of the solid material and via a "handler". It can be seen hereby that the thermal stress ability of the "handler" must be very high, because very high temperatures appear. According to WO 2013/126927 A2, the laser beams are further always introduced into the solid via a surface, which is not part of the layer to be separated. This also leads to a strong heating of the solid. The high temperatures also have the disadvantage that the solid distorts or expands unintentionally, whereby the generation of crystal lattice modifications is only possible in a highly inaccurate manner.

According to WO 2013/126927 A2, thick and large solids can thus not be processed.

It is thus the object of the invention at hand to provide an alternative method for cutting off solid portions, in particular a plurality of solid layers, from a solid.

According to the invention, the above-mentioned object is solved by means of a method for creating a detachment zone in a solid in order to detach a solid portion, especially a solid layer, from the solid, wherein the solid portion, which is to be detached, is thinner than the solid, from which the solid portion has been removed. According to the invention, the method comprises at least the steps of providing a solid, which is to be processed, wherein the solid is made of a chemical compound; providing a LASER light source or a laser radiation source, respectively; applying LASER radiation from the LASER light source to the solid, wherein the laser beams penetrate into the solid via a surface of the solid portion, which his to be cut off, wherein the LASER radiation controls the temperature of a predefined portion of the solid inside the solid in a defined manner such that a detachment zone or a plurality of partial detachment zones is formed. Particularly preferably, the temperature produced by the laser beams in the predefined portion of the solid is so high, in particular more than 200° C. or more than 500° C. or more than 800° C. or more than 1000° C. or more than 1500° C. or more than 2000° C., that the material forming the predefined portion is subject to modifications in the form of a predetermined conversion of material.

This solution is advantageous, because a material conversion or phase conversion, respectively, can preferably be effected without a local destruction of the crystal lattice, whereby a weakening or stability reduction, respectively, can be created in the solid in a highly controlled manner.

Further preferred embodiments are the subject matter of the subclaims and of the following description parts.

According to a further preferred embodiment of the invention at hand, the material conversion represents a decomposition of the chemical compound into a plurality or into all individual components or elements, respectively. This embodiment is advantageous, because the material combination, which is most suitable for cutting off the solid portion, can be adjusted in a defined manner by means of the systematic decomposition of the chemical compound of the solid.

According to the description at hand, a solid starting material is preferably understood as a monocrystalline, polycrystalline or amorphous material. Preferably, monocrystallines comprising a highly anisotropic structure are suitable because of the highly anisotropic atomic binding forces. The solid starting material preferably has a material or a material combination from one of the main groups 3, 4, 5 and/or the subgroup 12 of the periodic table of elements, in particular a combination of elements from the 3., 4., 5. main group and the subgroup 12, such as, e.g. zinc oxide or cadmium telluride.

In addition to silicon carbide, the semiconductor starting material can for example also consist of silicon, gallium arsenide GaAs, gallium nitride GaN, silicon carbide SiC, indium phosphide InP, zinc oxide, ZnO, aluminum nitride AIN, germanium, gallium(III) oxide Ga2O3, aluminum oxide Al2O3(sapphire), gallium phosphide GaP, indium arsenide InAs, indium nitride InN, aluminum arsenide AlAs or diamond.

The solid or the workpiece (e.g. wafer), respectively, preferably has a material or a material combination from one of the main groups 3, 4 and 5 of the periodic table of elements, such as, e.g., SiC, Si, SiGe, Ge, GaAs, InP, GaN, $Al_2O_3$(sapphire), AIN. Particularly preferably, the solid has a combination of elements from the fourth, third and fifth group of the periodic table. Possible materials or material combinations are thereby e.g. gallium arsenide, silicon, silicon carbide, etc. The solid can furthermore have a ceramic (e.g. Al2O3—aluminum oxide) or can consist of a ceramic, preferred ceramics are thereby, e.g., perovskite ceramics (such as, e.g., Pb-, O-, Ti/Zr-containing ceramics) in general and specifically lead-magnesium-niobate, barium titanate, lithium titanate, yttrium-aluminum-garnet, in particular yttrium-aluminum-garnet crystals for solid laser applications, SAW ceramics (surface acoustic wave), such as, e.g., lithium niobate, gallium orthophosphate, quartz, calcium titanate, etc. The solid thus preferably has a semiconductor material or a ceramic material or the solid particularly preferably consists of at least one semiconductor material or a ceramic material, respectively. Preferably, the solid is an ingot or a wafer. Particularly preferably, the solid is a material, which is at least partially transparent for laser beams. It is thus furthermore conceivable for the solid to have a transparent material or to partially consist of or be made of, respectively, a transparent material, such as, e.g. sapphire. Further materials, which are hereby possible as solid material alone or in combination with another material, are, e.g., "wide band gap" materials, InAlSb, high-temperature superconductors, in particular rare earths cuprate (e.g. YBa2Cu3O7). In addition or in the alternative, it is conceivable for the solid to be a photomask, wherein every photomask material known on the filing date and particularly preferably combinations thereof can be used as photomask material in the case at hand. In addition or in the alternative, the solid can further have silicon carbide (SiC) or can consist thereof.

Preferably, the solid is an ingot, which, in an initial state, i.e. in a state prior to cutting off the first solid portion, preferably weighs more than 5 kg or more than 10 kg or more than 15 kg or more than 20 kg or more than 25 kg or more than 30 kg or more than 35 kg or more than 50 kg. The solid portion is preferably a solid layer, in particular a wafer with a diameter of at least 300 mm.

According to a further preferred embodiment of the invention at hand, the LASER radiation is introduced into the solid with a pulse density of between 100 nJ/$\mu m^2$ and 10000 nJ/$\mu m^2$, preferably between 200 nJ/$\mu m^2$ and 2000 nJ/$\mu m^2$ and particularly preferably between 500 nJ/$\mu m^2$ and 1000 nJ/$\mu m^2$ for controlling the temperature in a defined manner.

According to a further preferred embodiment of the invention at hand, the receiving layer has a polymer or consists thereof, wherein the polymer is preferably polydimethylsiloxane (PDMS) or an elastomer or an epoxy resin or a combination thereof.

According to a further preferred embodiment of the invention at hand, the energy of the laser beam of the laser, in particular fs laser (femtosecond laser) is chosen in such a way that the material conversion in the solid or in the crystal, respectively, in at least one direction is smaller or larger than 30-times, or 20-times, or 10-times or 5-times or three-times the Rayleigh length.

According to a further preferred embodiment of the invention at hand, the wavelength of the laser beam of the laser, in particular of the fs laser, is chosen in such a way that the linear absorption of the solid or of the material, respectively, is less than 10 $cm^{-1}$ and preferably less than 1 $cm^{-1}$ and particularly preferably less than 0.1 $cm^{-1}$.

According to a further preferred embodiment of the invention at hand, the solid is connected to a cooling device via a solid surface, wherein the solid surface, which is connected to the cooling device, is embodied parallel or substantially parallel to the surface, via which the laser beams penetrate into the solid, wherein the cooling device is operated as a function of the laser application, in particular as a function of the temperature control of the solid, which results from the laser application. Particularly preferably, the surface, via which the solid is connected to the cooling device, is located exactly opposite the surface, via which the laser beams penetrate into the solid. This embodiment is advantageous, because a temperature increase of the solid, which occurs in response to the generation of the modifications, can be limited or reduced. The cooling device is preferably operated in such a way that the heat input introduced into the solid by means of the laser beams is removed from the solid through the cooling device. This is advantageous, because the occurrence of thermally induced stresses or deformations can be reduced significantly through this.

According to a further preferred embodiment of the invention at hand, the cooling device has at least one sensor device for capturing the temperature of the solid and, as a function of a predefined temperature course, effects a cool-down of the solid. This embodiment is advantageous, because a temperature change of the solid can be captured in a highly accurate manner by means of the sensor device. The change of the temperature is preferably used as data input for controlling the cooling device.

According to a further preferred embodiment of the invention at hand, the cooling device is coupled to a rotating means and the cooling device comprising the solid arranged thereon is rotated by means of the rotating means during the generation of the modifications, in particular with more than 100 revolutions per minute or with more than 200 revolutions per minute or with more than 500 revolutions.

According to a further preferred embodiment of the invention at hand, the number of the generated modifications per $cm^2$ is different in at least two different zones of the solid, wherein a first block of modifications is generated in a first zone, wherein the individual modifications per line are preferably generated spaced apart from one another by less than 10 μm, in particular less than 5 μm or less than 3 μm or less than 1 μm or less than 0.5 μm, and the individual lines of the first block are generated spaced apart from one another by less than 20 μm, in particular less than 15 μm or less than 10 μm or less than 5 μm or less than 1 μm, wherein a first partial detachment zone is formed by the first block of modifications and a second block of modification lines is generated in a second zone, wherein the individual modifications per line are preferably generated spaced apart from one another by less than 10 μm, in particular less than 5 μm or less than 3 μm or less than 1 μm, or less than 0.5 μm, and the individual lines of the second block are generated spaced apart from one another by less than 20 μm, in particular less than 15 μm or less than 10 μm or less than 5 μm or less than 1 μm, wherein a second partial detachment zone is formed by the second block of modifications, wherein the first zone and the second zone are spaced apart from one another by a third zone, wherein no modifications or essentially no modifications are generated in the third zone by means of laser beams, and the first zone is spaced apart from the second zone by more than 20 μm, in particular more than 50 μm or more than 100 μm or more than 150 μm or more than 200 μm. This embodiment is advantageous, because mechanical stresses, which are so large that either a local cracking of the solid can take place or that a crack is created in the solid as a result of a further triggering event, such as the thermal application of a receiving layer arranged on the solid, can be created in the solid by means of the local generation of modification blocks. It has been recognized that the modification blocks have the effect that a tear is also guided in a stable manner in a zone between two modification blocks. Thanks to the modification blocks, a controlled and highly accurate crack propagation can be effected by means of fewer modifications. This has significant advantages, because the processing time is shortened, the energy consumption is reduced, and the heating of the solid is reduced.

The modifications in the first block are preferably generated at pulse intervals of between 0.01 μm and 10 μm and/or line spacings of between 0.01 μm and 20 μm are provided, and/or a pulse repetition frequency of between 16 kHz and 20 MHz is provided.

According to a further aspect of the invention at hand, an optics, by means of which the laser beams are guided from a laser beam source to the solid, is adapted as a function of the location, at which a modification is generated, from which at least one change of the numerical aperture is effected, wherein the numerical aperture at a location in the edge zone of the solid is smaller than at a different location of the solid, which is located closer to the center of the solid. This embodiment is advantageous, because modifications comprising different properties are generated. In particular in the edge zone, i.e. in the zone of up to 10 mm or of up to 5 mm or of up to 1 mm (in radial direction) away from the edge, an optics is preferably used, which is a numerical aperture of between 0.05 and 0.3, in particular of substantially or of exactly 0.1. For the remaining zones, an optics is preferably used, in the case of which the numerical aperture is between 0.2 and 0.6, preferably between 0.3 and 0.5, and particularly preferably is substantially or exactly 0.4.

According to a further preferred embodiment of the invention at hand, the thermal application of the receiving layer comprises a cool-down of the receiving layer to a temperature of below 20° C., in particular below 10° C. or below 0° C. or below −10° C. or below 100° C. or to or below the glass transition temperature of the material of the receiving layer.

By means of the temperature control, modifications are or the material conversion is generated by means of LASER, wherein the pulse intervals are provided between 0.01 μm and 10 μm, in particular with 0.2 μm, and/or line spacings of between 0.01 μm and 20 μm, in particular with 3 μm, and/or a pulse repetition frequency of between 16 kHz and 20 MHz, in particular with 128 kHz, is provided, and/or a pulse energy of between 100 nJ and 2000 nJ, in particular with 400 nJ, is provided. Particularly preferably, a picosecond or femtosecond laser is used for the method according to the invention, in particular when applying silicon carbide, wherein the LASER preferably has a wavelength of between 800 nm and 1200 nm, in particular of 1030 nm or 1060 nm. The pulse duration is preferably between 100 fs and 1000 fs, in particular at 300 fs. Preferably, a lens for focusing the laser beam is furthermore used, wherein the lens preferably effects a 20-100-times reduction, in particular a 50-times reduction or focusing, respectively, of the LASER beam. Preferably, the optics for focusing the laser beam furthermore has a numerical aperture of between 0.1 and 0.9, in particular of 0.65.

Preferably, every material conversion effected by means of the LASER radiation represents a modification of the material of the solid, wherein the modifications can additionally or in the alternative be understood as destruction of the crystal lattice of the solid, e.g. According to a further preferred embodiment of the invention at hand, the solid is moved with respect to the LASER light source, in particular displaced, in particular rotated. The movement, in particular rotation, of the solid with respect to the LASER light source preferably takes place in a continuous manner. The rotational speeds appearing thereby preferably exceed 1 revolution per second or 5 revolutions per second or 10 revolutions per second or a linear speed of at least 100 mm/s, respectively. For this purpose, the solid is preferably arranged on a rotary table or rotary chuck, respectively, in particular by means of adhesion. The number of modification per $cm^2$ of the solid surface, through which the LASER radiation penetrates into the solid in order to generate the modifications, per rotation is preferably below a predefined maximum number, wherein the maximum number of the modifications per $cm^2$ and per rotation is preferably determined as a function of the solid material and/or of the energy density of the LASER radiation and/or as a function of the duration of the LASER radiation impulses. Preferably, a control device is provided, which determines the maximum number of the modifications to be generated per $cm^2$ per rotation as a function of at least two or three or all of the above-mentioned parameters and preferably of further parameters by means of predefined data and/or functions. This is especially advantageous, because it was recognized that damaging vertical cracks are created, when the damage density is too high, which results from stresses, which are created between the processed zones and the zones, which have not been processed yet.

In addition or in the alternative, the modifications are generated with different patterns, in particular distances between the individual newly-generated modifications and/or with changed energy input, in particular reduced energy input, in response to consecutive rotations of the solid with respect to the LASER light source. Either the laser or the wafer or solid, respectively, can in particular be displaced in XY direction, wherein the modifications are generated as a function of the translational XY displacement. According to a preferred embodiment, an XY table is used, on which the solid is arranged during the operation of the laser. The optics, by means of which the LASER beams are deflected, is preferably readjusted or newly adjusted, respectively, continuously or in stages, in particular as a function of a movement of the solid, in particular of a rotation of the solid, by means of the already mentioned control device or an alternative control device. Due to the readjustment or new adjustment, respectively, an adjustment of a second LASER beam course preferably takes place with respect to the first LASER beam course, which is adjusted prior to the readjustment or new adjustment, respectively, which differs from the first LASER beam course. As a function of the rotation of the solid, the control device thus preferably adjusts different LASER beam courses. Particularly preferably, the LASER scanning direction is thereby in each case readjusted or newly adjusted, respectively, or changed, respectively. In addition or in the alternative, the control device preferably controls the LASER light source, the optics, in particular the scanners, and/or the device, which displaces the solid, in particular the rotary table or rotary chuck, respectively, in such a way that the energy input per rotation remains the same or decreases, wherein the energy input into the solid preferably decreases continuously, i.e. with each rotation, or decreases in stages, i.e. in each case after a plurality of rotations. Wherein the number of rotations per stage can differ from one another in the case of a gradual decrease of the energy input, a first stage can comprise more than 2 rotations, e.g., and another stage can comprise more or fewer rotations than the first stage. It is furthermore conceivable that the stages in each case comprise the same number of rotations. The stage method can further also be mixed or combined, respectively, with the continuous method.

According to a preferred embodiment, the laser beam can also repeatedly apply modifications to a line, so that a total modification is generated in a line or row, respectively. According to a further alternative, the lines can cross or overlap one another, respectively, when applying modifications to the laser, wherein the first line of the modifications can in particular intersect one another at a predetermined angle of for example 900, 450, 30°, 60° or at another freely selectable angle. The intersecting angles between lines of the laser application for generating modifications can thereby orientate themselves on the crystal orientation of the material of the solid, in order to increase the effectiveness of the added modifications.

In addition or in the alternative, the LASER light source is embodied as scanner and the generation of the modifications takes place a function of the laser scanning direction, the laser polarization direction and the crystal orientation. The devices required for generating modifications, in particular the LASER light source, the optics, in particular the scanner, and the device, which displaces the solid, in particular the rotary table or rotary chuck, respectively, is preferably controlled by means of the already mentioned control device or by means of an alternative control device, which, as a function of at least two or three of the above-mentioned parameters and preferably further parameters, by means of predefined data and/or functions.

In addition or in the alternative, the distance between the centers of two modifications, which are generated consecutively in modification generating direction or in circumferential direction of the solid, is less than 10000 nm, in particular less than 1000 nm, in particular less than 100 nm.

In addition or in the alternative, the outer limitations of modifications, which are generated consecutively in modification generating direction or in circumferential direction of the solid, are spaced apart from one another by less than 10000 nm, in particular less than 1000 nm, in particular less than 100 nm.

The invention at hand can further refer to a method for creating a detachment zone in a solid in order to detach a solid portion from the solid, which comprises at least the below-mentioned steps of:

providing a solid, which is to be processed, providing a LASER light source, applying LASER radiation from the LASER light source to the solid, wherein the LASER radiation generates modifications, in particular crystal lattice defects, in the solid, wherein a control device for controlling the LASER light source and/or a device, which displaces the solid, in particular a rotary table or rotary chuck, respectively, and/or an optics, in particular a scanner, as a function of individual or a plurality of certain parameters or as function of individual or a plurality of these parameters is provided.

The solid is preferably rotated with respect to the LASER light source and the number of the modifications per $cm^2$ of the solid surface per rotation, through which the LASER radiation penetrates into the solid in order to generate the modifications, is below a predefined maximum number, wherein the maximum number of the modifications per $cm^2$ and per rotation is preferably determined as a function of the solid material and of the energy density of the LASER radiation, and/or the modifications are generated with different patterns, in particular distances between the individual newly generated modifications and/or with changed energy input, in particular reduced energy input, in response to consecutive rotations of the solid with respect to the LASER light source, and/or the LASER light source is embodied as scanner and the generation of the modifications takes place as a function of the laser scanning direction, the laser polarization direction and the crystal orientation, and/or the distance between the centers of two modifications, which are generated consecutively in modification generating direction or in circumferential direction of the solid is less than 10000 nm, in particular less than 1000 nm, in particular less than 100 nm, and/or the outer limitations of modifications, which are generated consecutively in modification generating direction or in circumferential direction of the solid, are spaced apart from one another by less than 10000 nm, in particular less than 1000 nm, in particular less than 100 nm.

Preferably, the maximally possible number of the modifications, which can be generated in one displacement cycle, in particular one rotation, of the solid with respect to the optics, in particular a scanner, is determined by a plurality of parallel lines, which are in particular spaced apart from one another in radial direction, and the modifications, which can be maximally generated per line. According to a preferred embodiment, the laser beam can be divided into a plurality of laser beams by means of a diffractive optical element, in order to thus simultaneously generate a corresponding number of modifications according to the splitting of the laser beam.

The plurality of the lines preferably comprises at least two and preferably at least 10 and particularly preferably up to 50 or up to 100 or up to 200 lines. With regard to the generated patterns, it is conceivable thereby that in the case of a certain number of lines in a first displacement cycle, e.g. only every $x^{th}$ line or every $x^{th}$ and $y^{th}$ line or every $x^{th}$ and every $x^{th}$ minus z line is provided with modifications. Concretely, every $5^{th}$ line, for example, could be provided with modifications. In the alternative, every $5^{th}$ and every $7^{th}$ line could be provided with modifications. In the alternative, e.g., every $5^{th}$ and every $5^{th}$ minus 2 could be provided with modifications, which would then result in that the $3^{rd}$, $5^{th}$, $8^{th}$, $10^{th}$ $13^{th}$, $15^{th}$, etc. line is provided with modifications. In addition, it is possible that the modifications are generated block by block, that is, that for example a block of 50 consecutive lines includes a modification and the following 50 lines do not include any modifications at all, wherein this block of 50 lines without modification is in turn followed by a block of 50 lines comprising a modification. This means that block by block modifications of a plurality of lines are provided alternately. According to a further embodiment, the width of such alternating blocks can vary according to the distance from the edge of the sample, that is that the blocks have a smaller line number of modifications for example in the area of the edge, and have a higher line number of modifications towards the center of the sample. It is conceivable in addition or in the alternative that the distance between the lines, in which modifications are generated, change as a function of a function. In a second displacement cycle, which preferably appears after the end of the first displacement cycle, in particular after a first rotation, alternative lines, which are preferably spaced apart relative to one another, are preferably written. In the second displacement cycle and in the further displacement cycles, other line numbers can then be provided for the variables x, y, z. More or fewer variables can further be provided. In addition or in the alternative, the distance between the individual modifications of a line can be generated according to a pattern. The modifications in one line are thus preferably generated in a first displacement cycle, in particular a first rotation, e.g. only at every $a^{th}$ point (at which a modification is provided) or at every $a^{th}$ and $b^{th}$ point or at every $a^{th}$ and every $a^{th}$ minus c point. In addition or in the alternative, it is conceivable that the distance between the points, at which modifications are generated, changes as a function of a function. In a second displacement cycle, which preferably appears after the end of the first displacement cycle, in particular after a first rotation, alternative points, which are preferably spaced apart relative to one another, are preferably written. In the second displacement cycle and in the further displacement cycles, other line numbers can then be provided for the variables a, b, c. In addition or in the alternative, it is conceivable that the lines, which are processed, are determined at least as a function of a displacement point or displacement setting, respectively, in particular a rotational position, and the number of rotations and/or the points in a line, which are processed (or at which modifications are generated, respectively) are determined at least as a function of the displacement position or displacement point, in particular a rotational position, and the number of rotations. In particular in the case of linear displacement paths of the solid or of the optics, lines or strips of modifications, which are positioned at an incline to one another, in particular at a right angle, can be generated as well.

According to a further preferred embodiment, every material conversion, which is effected by means of the LASER radiation, represents a modification of the material of the solid, wherein the solid is moved in a translational manner in XY direction with respect to the LASER light source, and the number of modifications per $cm^2$ of the solid surface, through which the LASER radiation penetrates into the solid in order to generate the modifications, wherein the maximum number of the modifications per $cm^2$ and according to the translational movement in XY direction is preferably determined as a function of the solid material and of the energy density of the LASER radiation and/or the modifications are generated with different patterns, in particular distances between the individual newly generated modifications, and/or with changed energy input, in particular reduced energy input, according to the translational movement in XY direction of the solid with respect to the LASER light source, and/or the LASER light source is embodied as scanner, and the generation of the modifications takes place as a function of the laser scanning direction, the laser polarization direction and the crystal orientation, and/or the distance between the displacements of two modifications, which are generated consecutively in modification generating direction is less than 10000 nm, in particular less than 1000 nm, in particular less than 100 nm, and/or the outer limitations of modifications, which are generated consecutively in modification generating direction, are spaced apart from one another by less than 10000 nm, in particular less than 1000 nm, in particular less than 100 nm.

According to a further preferred embodiment, the LASER radiation generates modifications, in particular crystal lattice effects, in the solid, wherein the solid is moved in a translational manner with respect to the LASER light source, and the number of the modifications per $cm^2$ of the solid surface, through which the LASER radiation penetrates into the solid in order to generate the modifications, wherein the maximum number of the modifications per $cm^2$ and according to the translational movement in XY direction is preferably determined as a function of the solid material and of the energy density of the LASER radiation and/or the modifications are generated with different patterns, in particular distances between the individual newly generated modifications, and/or with changed energy input, in particular reduced energy input, according to the translational movement in XY direction of the solid with respect to the LASER light source, and/or the LASER light source is embodied as scanner, and the generation of the modifications takes place as a function of the laser scanning direction, the laser polarization direction and the crystal orientation, and/or the distance between the displacements of two modifications, which are generated consecutively in modification generating direction is less than 10000 nm, in particular less than 1000 nm, in particular less than 100 nm, and/or the outer limitations of modifications, which are generated consecutively in modification generating direction, are spaced apart from one another by less than 10000 nm, in particular less than 1000 nm, in particular less than 100 nm.

The control unit controls the generation of the modifications, for example as a function of the number of the displacement cycles and/or of the local heat development, which is preferably captured optically and/or by means of sensors, and/or as a function of the material properties, in particular the density and/or the stability and/or the thermal conductivity of the solid. The invention further relates to a method for cutting off at least one solid portion from a solid, in particular a wafer, at least comprising the steps of: arranging a receiving layer on a solid, which is treated according to a method according to one of claims 1 to 4, thermal application of the receiving layer for, in particular mechanically, generating crack expansion stresses in the solid, wherein a crack expands in the solid along the detachment zone due to the crack expansion stresses.

Further advantages, goals and characteristics of the invention at hand will be explained by means of the following description of attached drawings, in which the separating method according to the invention is illustrated in an exemplary manner. Components or elements, which are preferably used in the method according to the invention, and/or which at least substantially correspond in the figures with regard to their function, can hereby be identified with the same reference numerals, wherein these components or elements do not need to be numbered or explained in all figures.

Figure 6B:
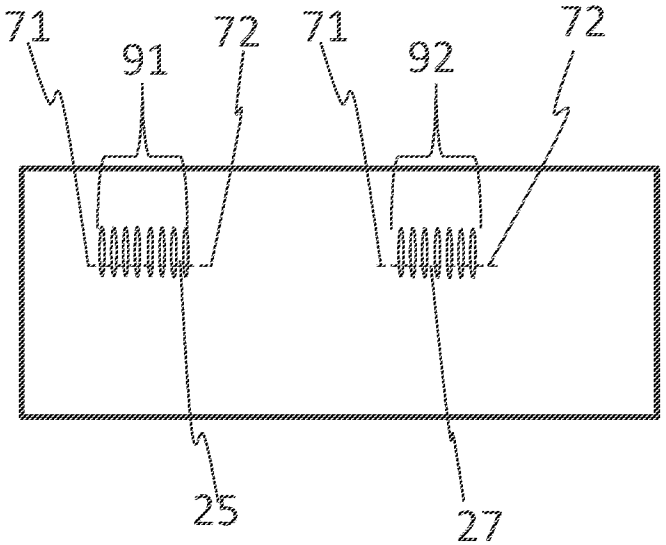
Figure 6A:
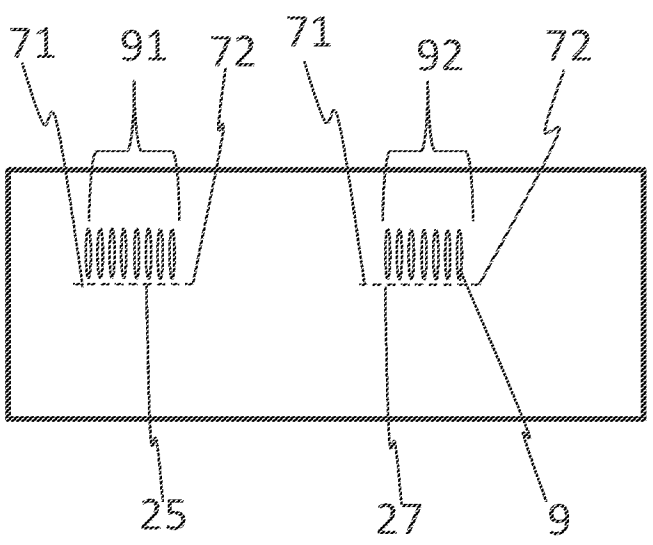
Figure 6C:
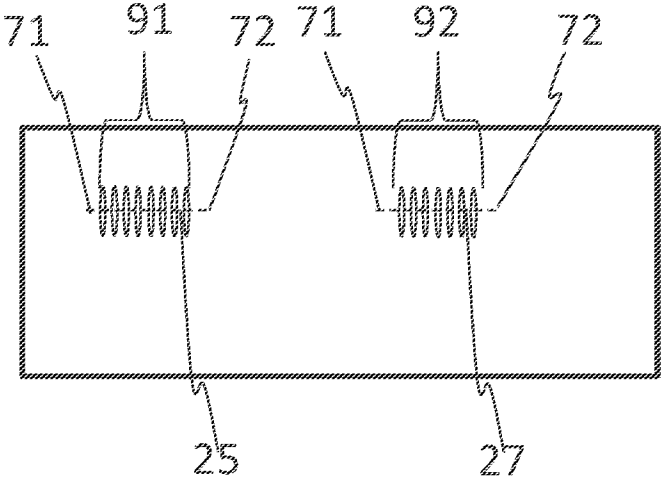
Figures 7A, 7B, 7C:
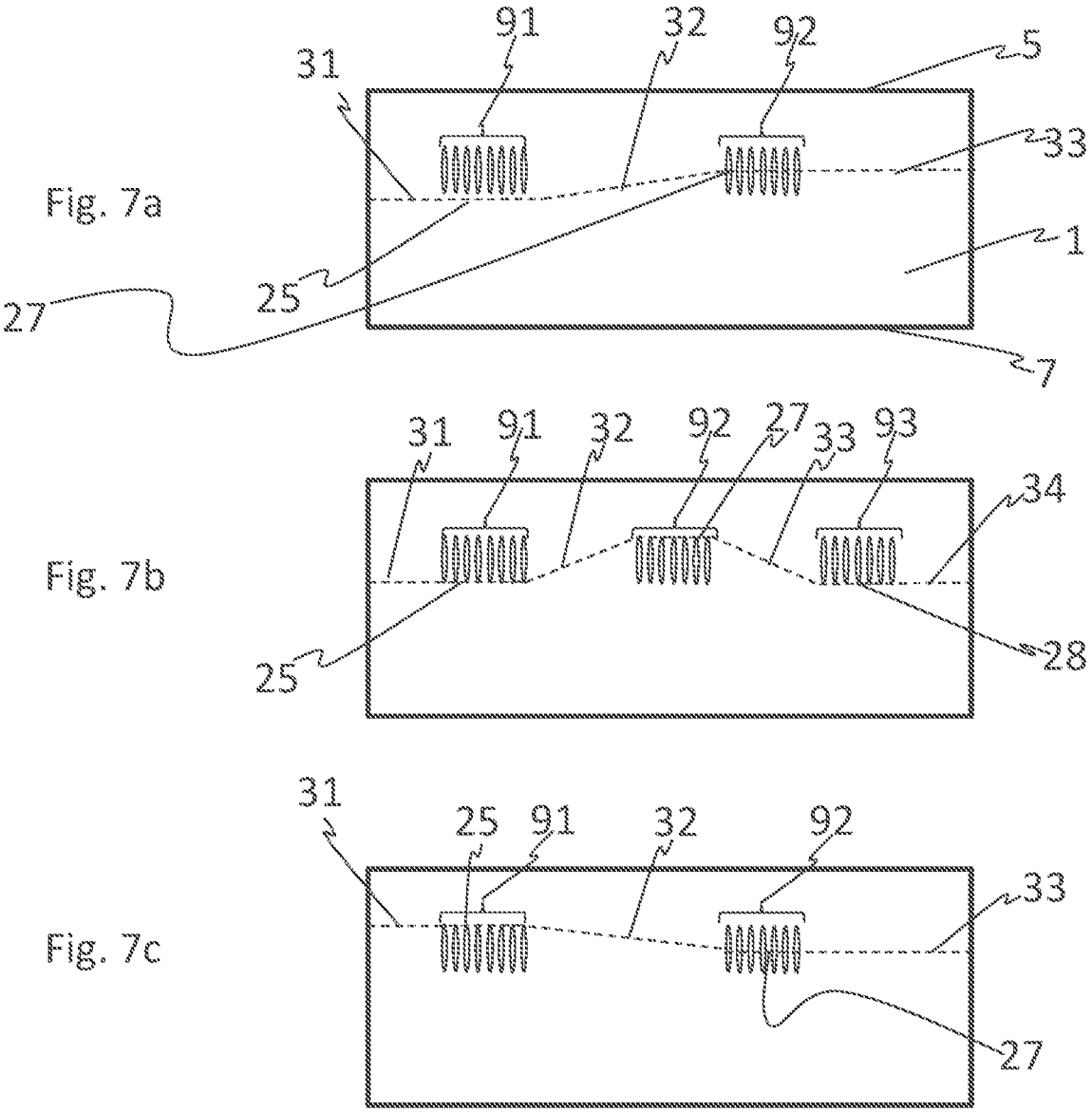
Figures 8A, 8B, 8C:
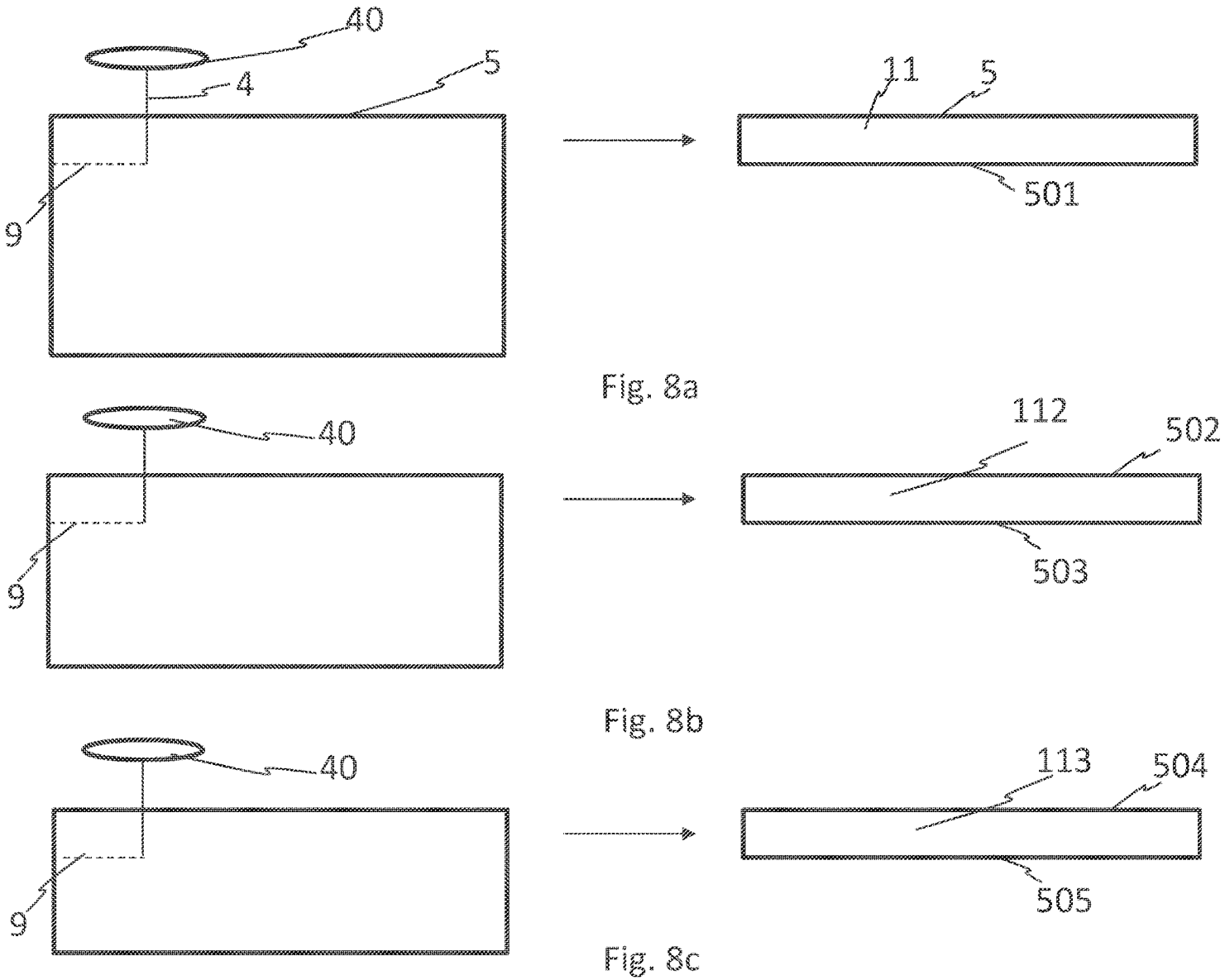
Figure 10A:
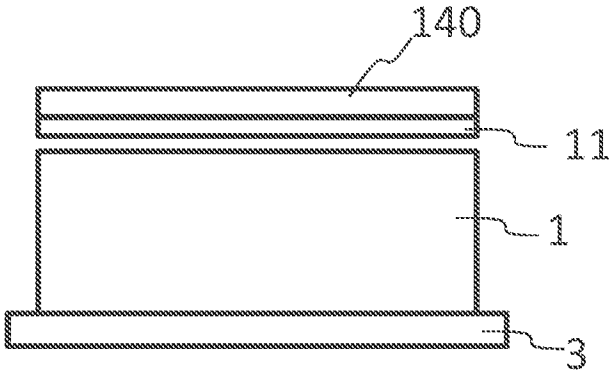
Figure 10B:
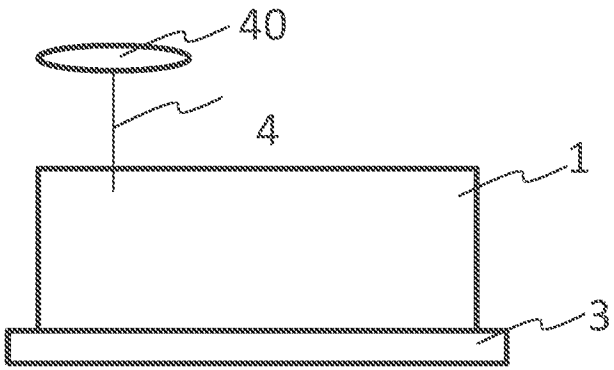
Figure 10C:
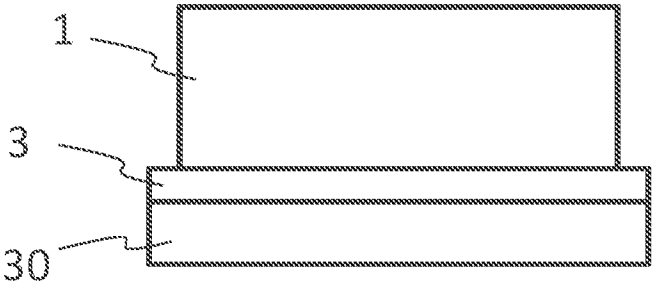
Figure 10D:
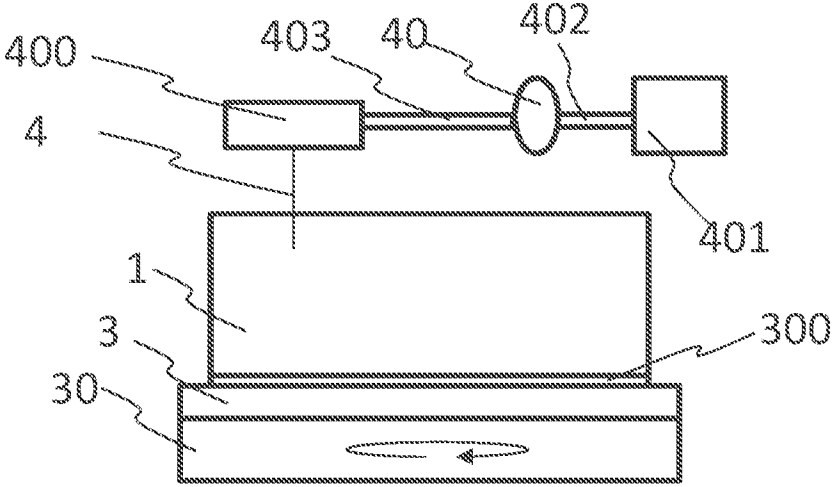
Figure 11:
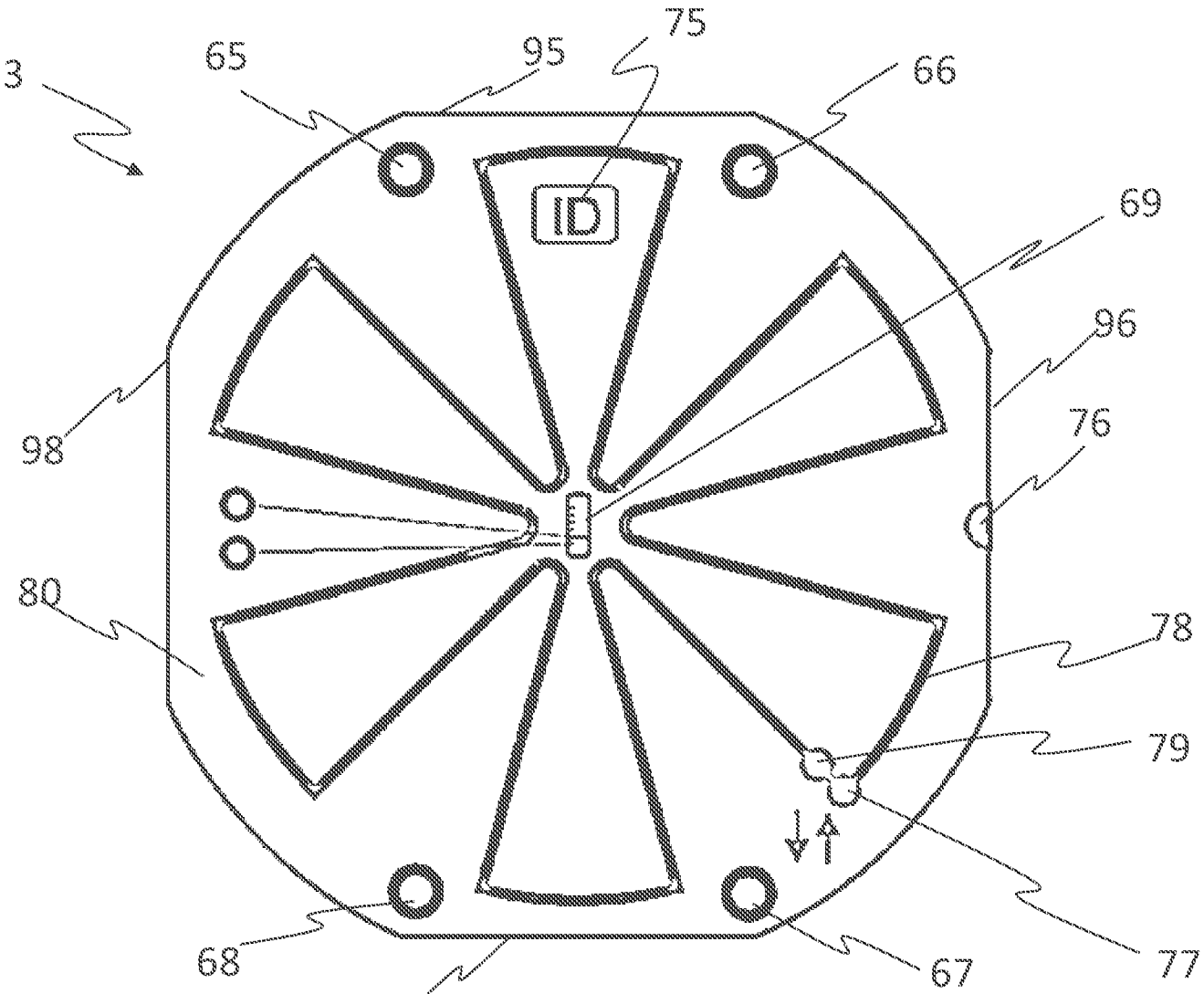
Figure 12:
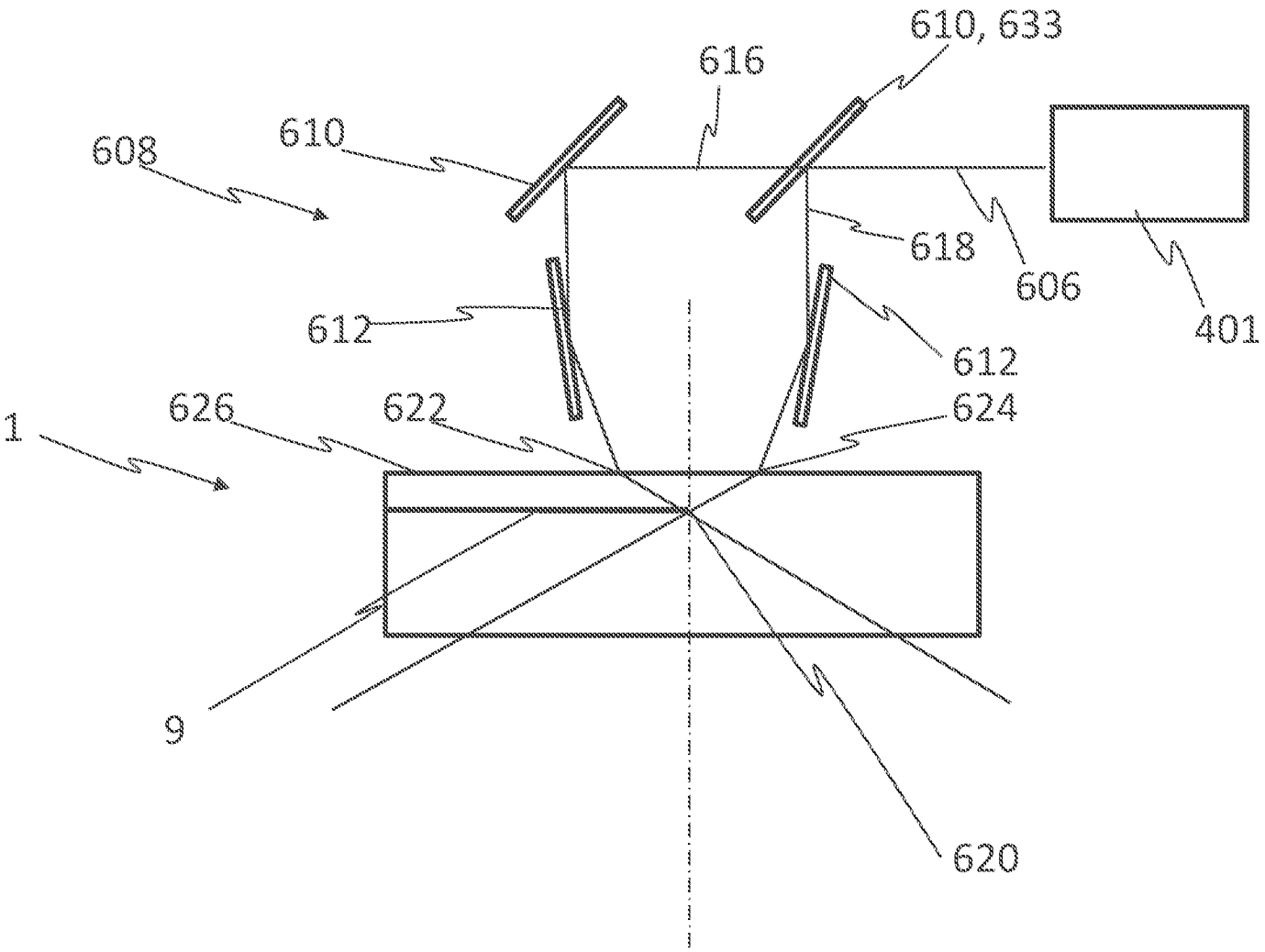

FIGS. 6a-c show three schematic illustrations of modification blocks and the local solid weakening or local solid cracks created through this;

FIGS. 7a-c show three schematic illustrations of exemplary crack paths;

FIGS. 8a-c show the repeated cut-off of solid portions or solid layers, respectively, in particular wafers, from a solid;

FIGS. 9a-f show a plurality of steps from the provision of the solid to the triggering of the crack as a result of a thermal application of the receiving layer;

FIG. 10a shows a schematic illustration of the state after the solid portion cut-off;

FIG. 10b shows a further laser application of the remaining solid for generating modifications for cutting off a further solid layer;

FIG. 10c shows a schematic illustration of the remaining solid arranged on a cooling device, wherein the cooling device is arranged on a displacement device, in particular a rotary table;

FIG. 10d shows a schematic illustration of the generation of modifications in the solid;

FIG. 11 shows a schematic illustration of a cooling device, in particular of a cooling chuck;

FIG. 12 shows a schematic illustration of a preferably used optics; and

Figure 13:
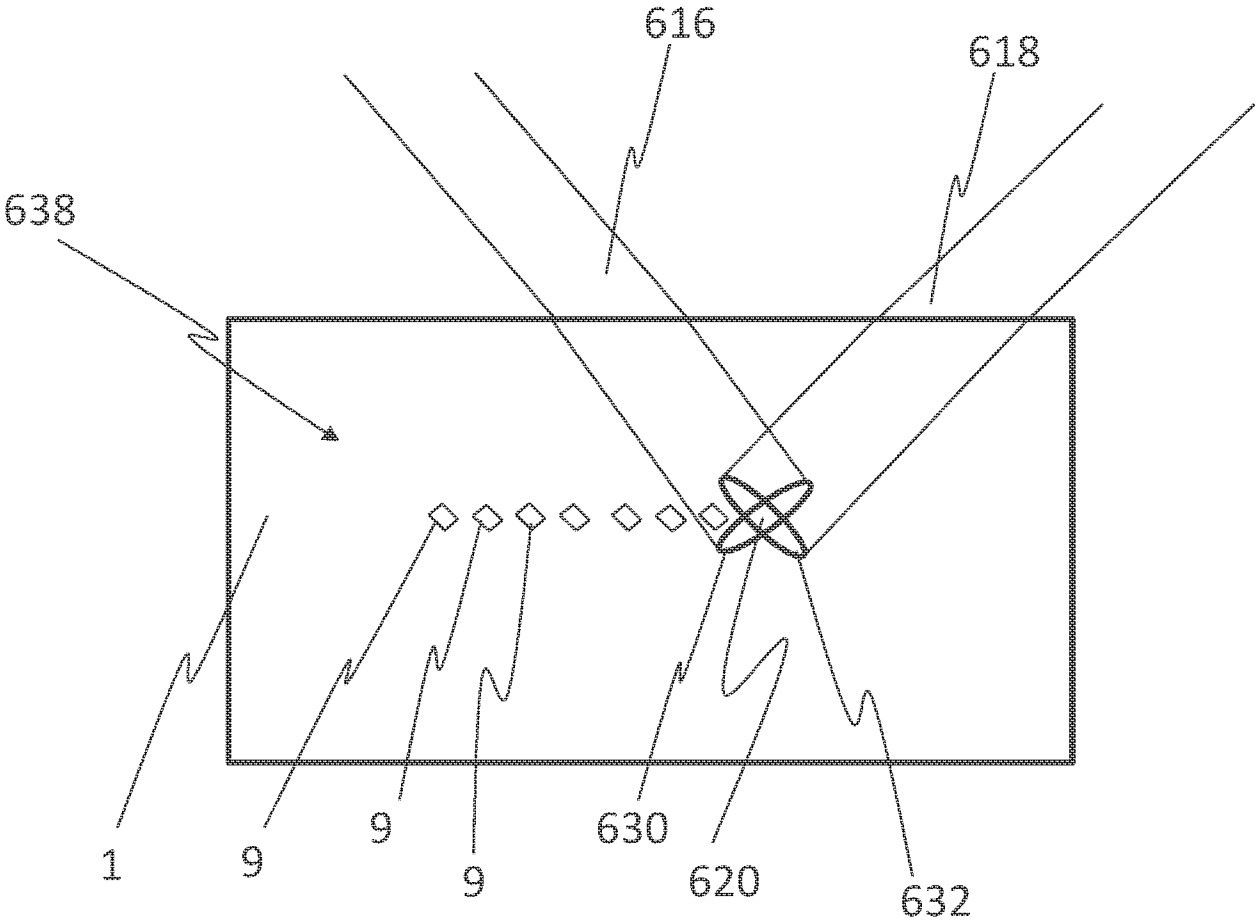

FIG. 13 shows a schematic illustration of overlapping beams or beam portions, respectively, in response to the generation of a modification in the solid.

Figure 1:
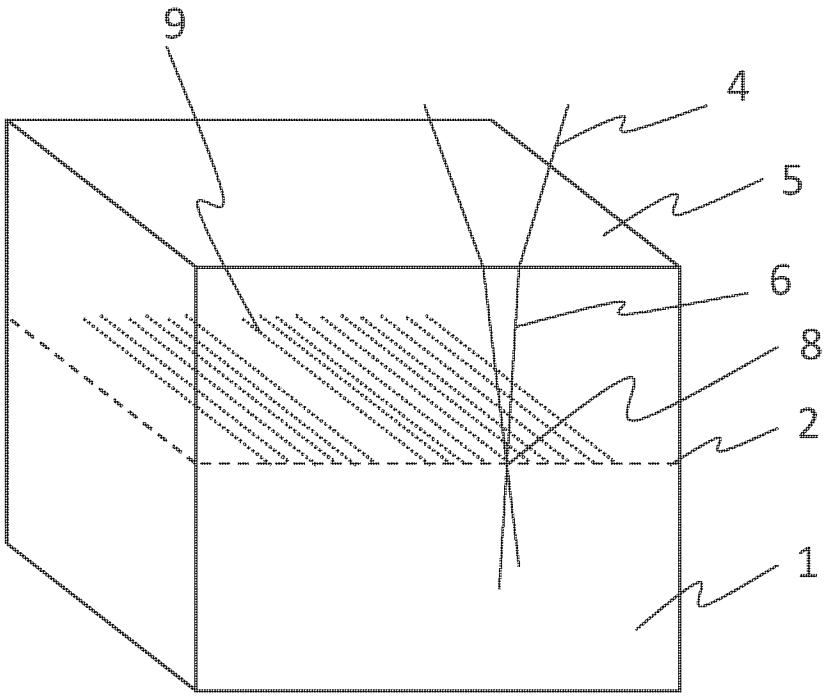
FIG. 1 shows a schematic illustration of the laser-based generation according to the invention of a detachment layer in a solid.

In FIG. 1, reference numeral 1 identifies the solid. According to the invention, modifications 9 are generated in the solid 1, in order to form a detachment zone 2, at which or along which, respectively, the solid 1 is separated into at least two components. The modifications 9 are thereby material conversions or phase conversions, respectively, of the solid material, by means of which the detachment zone 2 is created. The modifications 9 are generated by means of at least one laser beam 4. The laser beam 4 penetrates into the preferably at least partially transparent solid 1 via a preferably treated, in particular polished, surface 5. On the surface 5, the at least one laser beam is preferably broken, which is identified by reference numeral 6. The at least one laser beam then forms a focus 8 for generating the modification. The polished surface 5 can also be identified as main surface 18.

Figure 2:
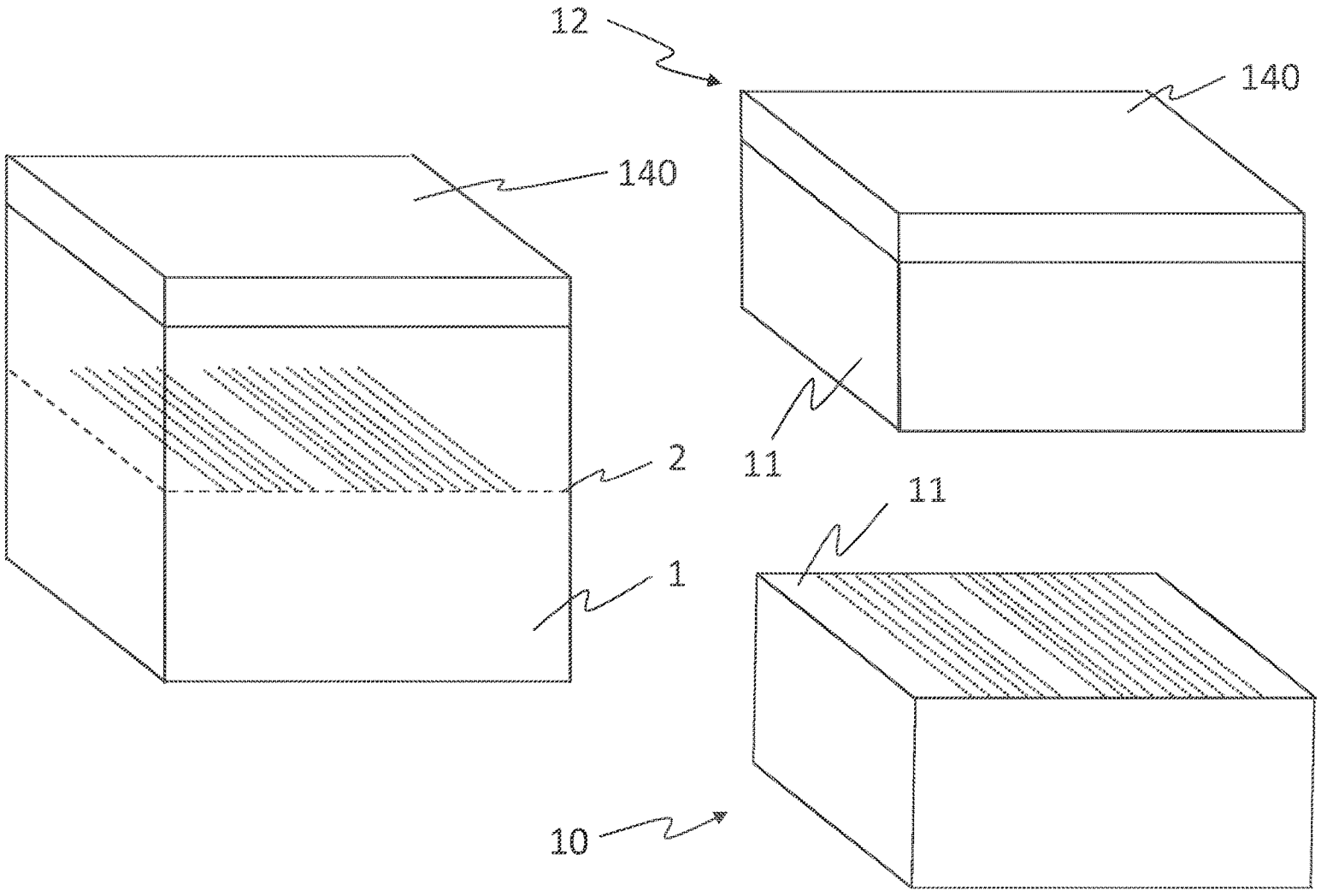
FIG. 2 shows a schematic illustration of a preferred cut-off process for cutting off a solid layer from a solid 7.

FIG. 2 also shows the treated solid 1, wherein a receiving layer 140 for introducing stresses into the solid 1, is arranged, in particular attached or generated, on at least one surface of the solid 1, in particular partially or completely covering or overlapping the surface 5. After splitting off the solid layer or the solid portion, respectively, from the solid 1, the receiving layer 140 initially remains on the split-off solid portion and thus serves to receive it. The receiving layer 140 preferably consists of a polymer material or has a polymer material, in particular PDMS. Due to a temperature control, in particular cool-down, of the receiving layer 140, the receiving layer 140 contracts and thus introduces stresses into the solid 1, by means of which a crack is triggered and/or is generated and/or guided for cutting off the solid portion from the solid 1.

The LASER application of the solid 1 particularly preferably represents a local temperature control of the solid 1, in particular in the interior of the solid 1. Due to the temperature control, the chemical bond of the solid material changes, whereby a change, in particular reduction, of the strength or stability, respectively, of the solid 1 results in the applied portion. The LASER application preferably takes place in a total plane, which penetrates in the solid 1, wherein it is also conceivable for at least or maximally 30% or 50% or 60% or 70% or 80% or 90% of the plane, which penetrates the solid 1, to experience the modification according to the invention.

Reference numeral 10 identifies a first solid portion after cutting through the solid 1, and reference numeral 12 identifies the second solid portion after separating the solid 1. Reference numeral 11 further identifies the surfaces, along which the two solid portions 10, 12 were separated from one another.

Figure 3:
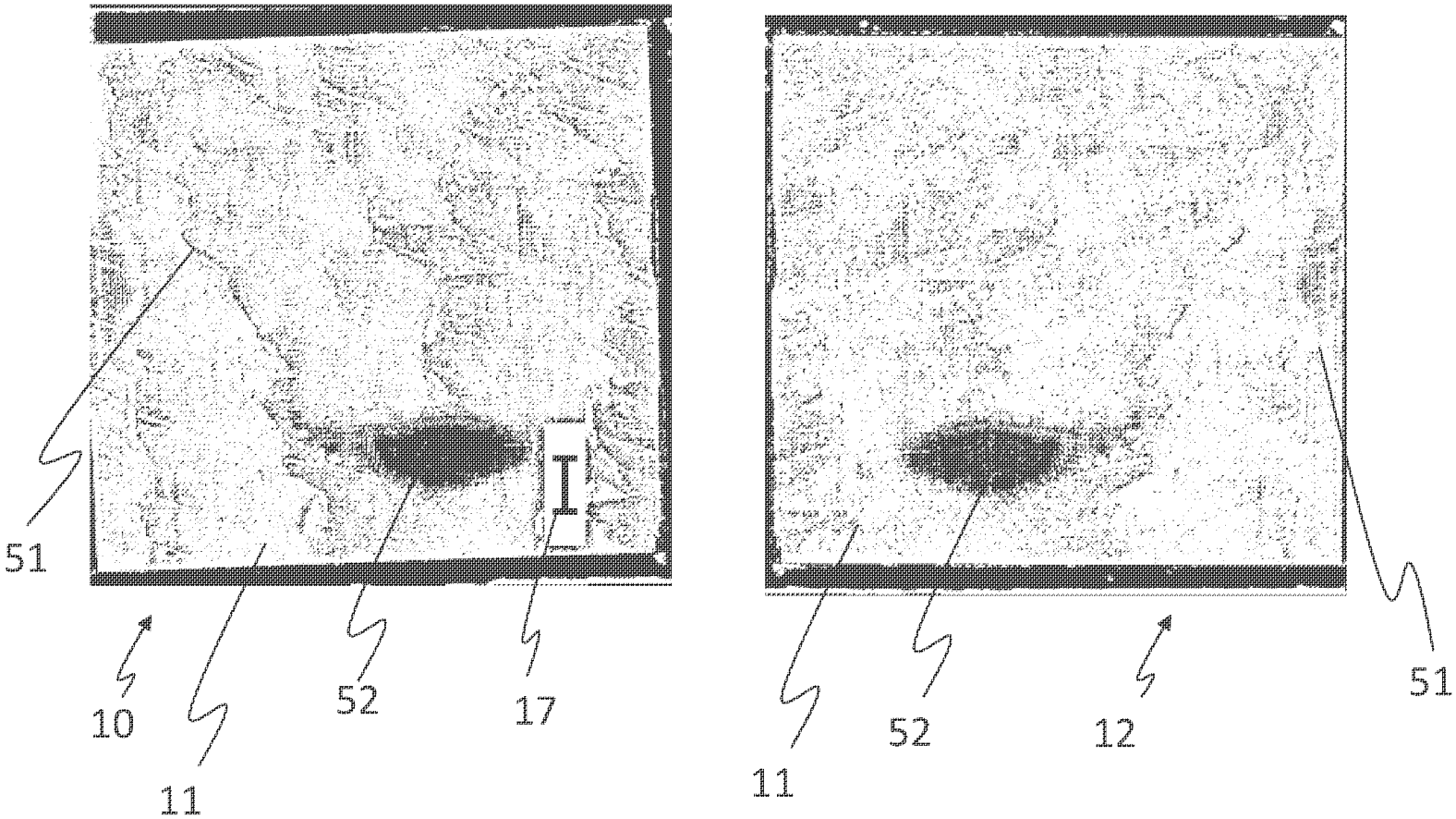
FIG. 3 shows two microscopic illustrations of the surfaces, which were created along the detachment zone, of the solid portions, which are cut off from one another.

FIG. 3 shows a surface 11 of a first solid portion 10 and of a second solid portion 12, wherein the first solid portion 10 and the second solid portion 12 were separated from one another along the surfaces 11. FIG. 3 furthermore shows an untreated zone 51 or untreated portion of the solid 1, respectively, and a treated zone 52 or treated portion of the solid 1, respectively. The treated portion 52 was created by means of the LASER application according to the invention and shows that the material of the solid 1 changed or was converted, respectively, in this zone.

Figure 4:
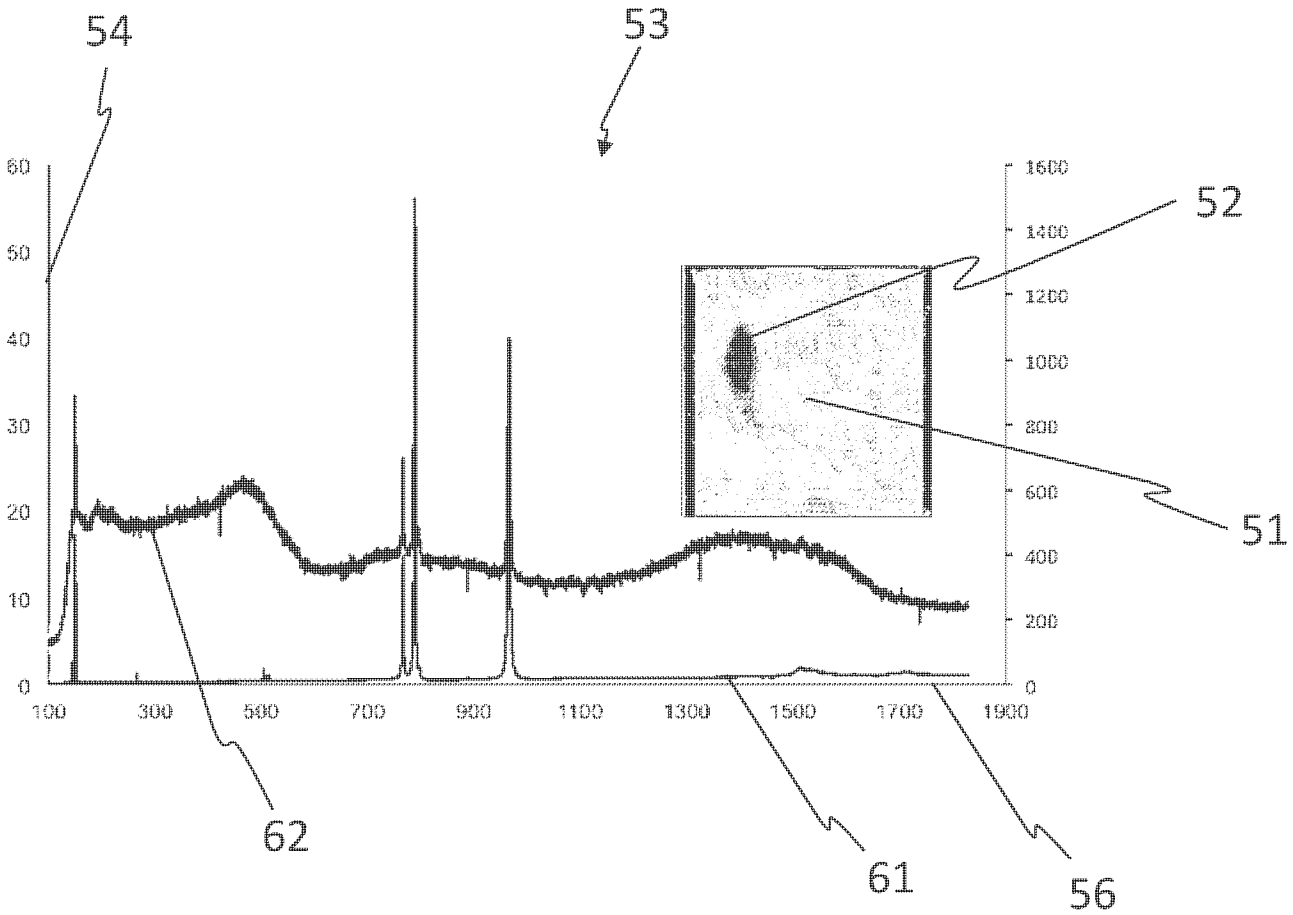
FIG. 4 shows an illustration for showing the effect according to the invention.

FIG. 4 shows a Raman spectrum (reference numeral 53) 6H-SiC with conditioning 1B after cutting off the solid portion 12. Reference numeral 54 identifies the intensity in % and reference numeral 56 identifies the wave number in $cm^{-1}$. Reference numeral 61 furthermore identifies the graph for the untreated material portion identified with reference numeral 51 in FIG. 3 and reference numeral 62 identified the graph for the treated material portion identified with reference numeral 52 in FIG. 3. It can be gathered from the Raman spectrum 53 that the material portions identified by reference numerals 51 and 52 have different material properties, in particular are different materials.

The LASER application according to the invention effects a material-specific, spatially resolved cumulation of the entry input, from which a defined temperature control of the solid 1 results at a defined location or at defined locations and within a defined time. In a concrete application, the solid 1 can consist of silicon carbide, whereby a locally highly limited temperature control of the solid 1 to a temperature of, e.g., more than 2830+/−40° C. is preferably carried out. New materials or phases, in particular crystalline and/or amorphous phases, result from this temperature control, wherein the resulting phases are preferably Si (silicon) and DLC (diamond-like carbon) phases, which are created with significantly reduced stability. The detachment portion 2 then results from this stability-reduced layer. The laser control preferably takes place by means of spatially resolved sample temperature measurement in order to avoid edge effects in response to the solid or wafer processing, respectively.

Figure 5D:
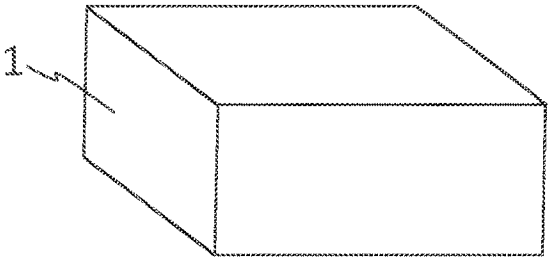
FIGS. 5d-5e show two schematic illustrations, in each case along the detachment zones of split solids, wherein the illustration according to FIG. 5d does not show any modification remainders and the illustration according to FIG. 5e shows modification remainders.
Figure 5E:
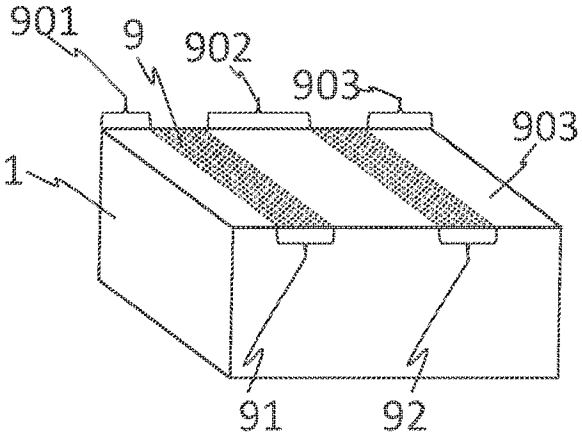
Figure 5A:
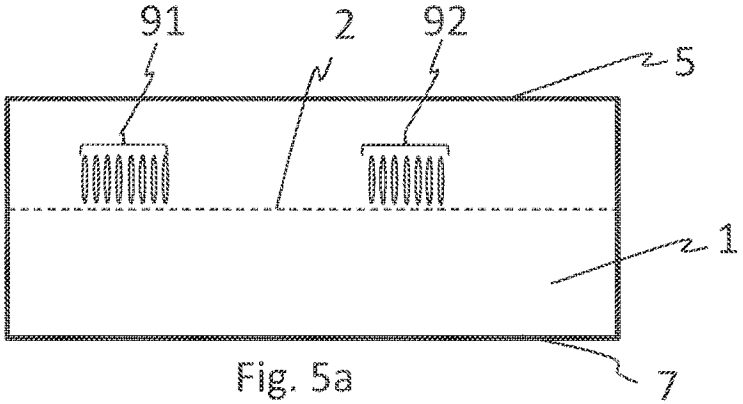
FIGS. 5a-5c show three schematic cross sectional illustrations, which in each case show modification blocks in a solid.

FIG. 5a shows that the number of the generated modifications per $cm^2$ is different in at least two different zones of the solid 1. In a first zone, a first block 91 is thereby generated at modification lines, wherein the individual modifications 9 per line are preferably generated spaced apart from one another by less than 10 μm, in particular less than 5 μm or less than 3 μm or less than 1 μm or less than 0.5 μm. The individual lines of the first modification block 91 are preferably generated spaced apart from one another by less than 20 μm, in particular less than 15 μm or less than 10 μm or less than 5 μm or less than 1 μm. Mechanical stresses are generated in the solid 1 by means of the first block 91 of modifications 91.

In a second zone, a second block 92 of modification lines is generated, wherein the individual modifications 9 per line are preferably generated spaced apart from one another by less than 10 μm, in particular less than 5 μm or less than 3 μm or less than 1 μm or less than 0.5 μm. The individual lines of the second block 92 are preferably generated spaced apart from one another by less than 20 μm, in particular less than 15 μm or less than 10 μm or less than 5 μm or less than 1 μm. Mechanical stresses are generated in the solid 1 by means of the second block 92 of modifications 92.

The first zone and the second zone are spaced apart from one another by a third zone, wherein no modifications or essentially no modifications 9 are generated in the third zone by means of laser beams, and the first zone is spaced apart from the second zone by more than 20 μm, in particular more than 50 μm or more than 100 μm or more than 150 μm or more than 200 μm.

The modifications 9 are hereby preferably introduced into the solid 1 via a surface 5 of the subsequent solid layer 12. The distance between the surface 5, via which the laser beams are introduced, to the modifications 9, is preferably less than the distance of the modifications 9 to a further surface 7 of the solid 1, which is spaced apart from the surface 5 and which is preferably oriented in parallel.

It can be seen that the detachment zone 2 according to this illustration is located on one side, in particular below or above all modifications 9 in solid longitudinal direction, and is preferably spaced apart from the modifications 9.

Figure 5B:
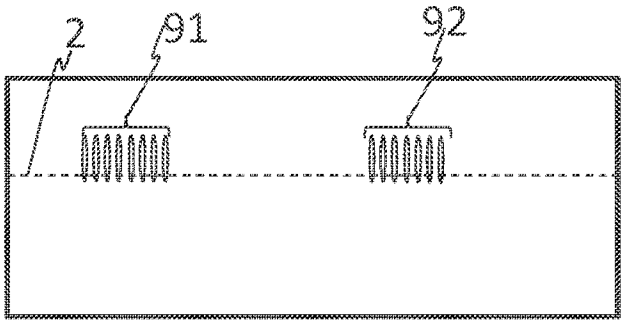

FIG. 5b show a similar basic construction. According to FIG. 5b, the detachment zone 2, however, extends through the modifications 9.

Figure 5C:
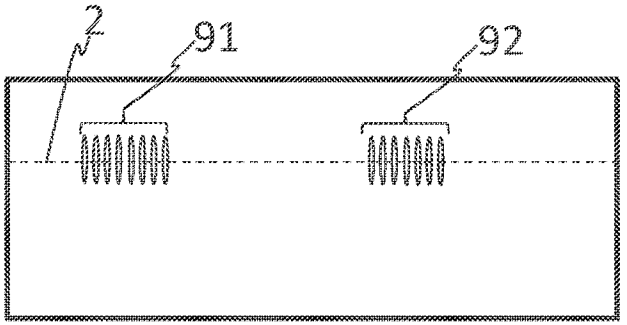

FIG. 5c further shows that the detachment zone 2 can also run through the center of the modifications 9.

The course of the detachment zone 2 can hereby be adjusted via the number of the modifications 9 and/or the size of the modifications 9 and/or the distance of the individual modifications 9 of a block 91, 92.

FIG. 5d shows the remaining solid 1 after the detachment of the solid layer 12 along the detachment zone 2 shown in FIG. 5a. Due to the fact that the modifications 9 are completely removed from the remaining solid 1 in this case, the remaining solid 1 does not show any remainders of these modifications 9.

In contrast, remainders of the modifications 9 can be gathered from FIG. 5e. These modification remainders result, when the solid 1 is cut off along a detachment zone 2, which is shown in FIG. 5b or 5c. It can further be seen that the modification blocks 91, 92 are preferably spaced apart from one another by cm2 each, preferably by means of fields 901, 902, 903 without modifications or with fewer modifications, respectively. The fields without modifications 9 or with fewer modifications 9 can hereby preferably be smaller or larger than the zone, in which the modification blocks 91, 92 are created. At least individual, a plurality or the majority of the zones, in which the modification blocks 91, 92 are generated, are preferably many times larger, in particular at least 1.1-times or 1.5-times or 1.8-times or 2-times or 2.5-times or 3-times or 4-times larger than the zones, in which no modifications 9 or fewer modifications 9 are generated.

FIGS. 6a-6c show a further embodiment of the invention at hand. According to these illustrations, the modification blocks 91, 92 serve to create local material weakening or local solid cracks or local stress increases. Reference numeral 25 hereby identifies a first partial detachment zone or crack portion, in which the local material weakening or local solid cracks or local stress increases appear, and reference numeral 27 hereby identifies a second partial detachment zone or crack portion, in which the local material weakening or local solid cracks or local stress increases appear as well. The individual partial detachment zones or crack portions preferably form ends 71, 72, beyond which the respective partial detachment zone or crack portion can be enlarged. The enlargement of the partial detachment zones or crack portions preferably takes place as a result of a force introduction, which is effected by means of the receiving layer 140 (see FIG. 2).

FIGS. 7a to 7c show embodiments, according to which the course of the detachment zone 2 is controlled in such a way as a result of the generation of the modification blocks 91, 92, 93 that predetermined patterns or thickness changes are created or compensated. The course of the detachment zone 2 can hereby be adjusted, e.g., via the number of the modifications 9 and/or the size of the modifications and/or the distance of the individual modifications 9 of a block 91, 92, 93.

In FIG. 7a, the detachment zone 2 is formed by the below-mentioned components: crack 31 between outer edge and first modification block 91, followed by the first crack portion 25, which is created directly by means of the first block 91 of modifications 9, follows by crack 32 between the two modification blocks 91 and 92, followed by the second crack portion 27, which is created directly by means of the second block 92 of modifications 9, followed by the crack 33 between the modification block 92 and the further outer edge of the solid 1. It can be seen through this that the detachment zone 2 can be predefined in such a way that a crack for cutting off the solid layer 12 form the solid 1 can run at different planes in sections.

It can be seen according to FIG. 7b that the detachment zone 2 can be chosen in such a way that the course of the crack includes a plurality of geometric turning points.

FIG. 7c shows a further possible design of the detachment zone 2 merely in an exemplary manner.

With regard to FIGS. 7a-7c, it is important to note that the formation of wavy courses can offer advantages in response to the further treatment of the exposed surfaces, in particular in the case of subsequent grinding and/or polishing steps. Due to the height of the modifications 9, which is very small in fact, the actual waviness, which is created via this, can only be captured in a high resolution. By means of modification blocks, such as, e.g., the blocks 91, 92, 93, however, the crack can be guided in a very well-controlled manner, also in the zones, in which no or fewer modifications 9 are generated.

FIGS. 8a-8c show a repeated processing of a solid 1, in particular of an ingot, wherein the solid 1 is in each case thinned by a solid portion 12, especially a solid layer 12. Receiving layers 140, which may need to be attached, as shown in FIG. 2, are not shown in these illustrations. In terms of the invention at hand, however, a receiving layer 140 for receiving the solid portion 12 and for triggering and/or supporting a crack can also be arranged on the surface 5, 502, 504.

FIGS. 8a-8c thus in each case show the application of LASER radiation from the LASER light source to the solid, wherein the laser beams penetrate into the solid 1 via a surface 5, 502, 504 of the solid layer 12, which is to be cut off. The LASER radiation controls the temperature of a predefined portion of the solid 1 inside the solid 1 in a defined manner such that a detachment zone 2 or a plurality of partial detachment zones are formed, the produced temperature in the predefined portion of the solid 1 is thereby preferably so high that the material forming the predefined portion is subject to modifications 9 in the form of a predetermined material conversion. The number and arrangement of the modifications 9 can thereby be adjusted and is preferably predefined. After cutting off the solid portion 12, LASER radiation from the LASER source is again applied to the remaining solid 1, wherein the LASER radiation controls the temperature of a predefined portion of the remaining solid 1 inside the remaining solid 1 in a defined manner such that a detachment zone 2 is formed, and the temperature created in the predefined portion of the remaining solid 1, in turn, is so high that the material, which forms the predefined portion, is subjected to a predetermined material conversion. Solid portions 12 of the same, similar or different thickness, e.g., in particular solid layers 12, in particular wafers, can thus be cut off from a solid 1. The solid 1 preferably has such a length that a plurality, in particular more than 2 or more than 5 or more than 10 or more than 20 or more than 50 or more than 100 or more than 150 or more than 200 solid layers 12 comprising a thickness of less than 1000 μm, in particular of less than 800 μm or of less than 500 μm or of less than 300 μm or of less than 200 μm or of less than 150 μm or of less than 110 μm or of less than 75 μm or of less than 50 μm, can be cut off therefrom. A machining of the newly exposed surface 502, 504 of the remaining solid 1 preferably takes place after every cut-off of a solid layer 12.

FIGS. 9a-9f show schematic illustrations of different process situations, as they can occur according to the method according to the invention for producing solid layers 12.

Figure 9A:
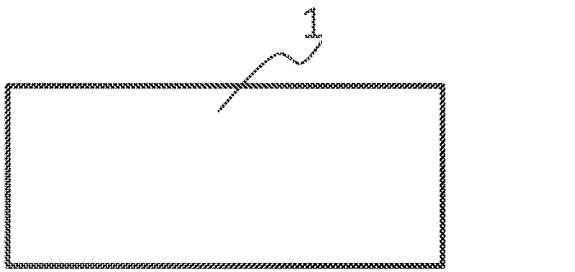

FIG. 9a shows the provision of the solid 1, in particular of an ingot.

Figure 9B:
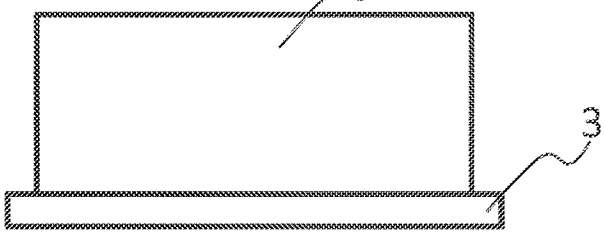

According to FIG. 9b, the provided solid 1 is arranged on a cooling device 3. The cooing device 3 is preferably a cooling chuck. Particularly preferably, the solid 1 is coupled or adhered, respectively, or welded or screwed or clamped to a tool carrier (chuck), wherein the tool carrier preferably comprises a cooling functionality and thus preferably becomes the cooling device 3. The tool carrier preferably consists of an alloy comprising a composition of 45%-60%, in particular 54% of iron, 20%-40%, in particular 29% of nickel and 10%-30%, in particular 17% of cobalt. The percentages hereby refer to the portion of the total mass. An example for a preferred cooling device 3 is shown in FIG. 11. The solid 1 and the cooing device 3 preferably have the same or a similar thermal expansion, respectively. Every thermal expansion in response to a temperature increase of 10° C. in a temperature range of between −200° C. and 200° C. is hereby preferably understood as similar thermal expansion, in the case of which the difference of the thermal expansions of the solid 1 and of the cooling device 3 is less than 50%, in particular less than 25% or less than 10% of the thermal expansion of the object (cooling device of ingot), which expands most. The thermal expansion of the solid 1 is preferably less than 10 ppm/K, in particular less than 8 ppm/K or less than 5 ppm/K, such as, e.g., less than 4 ppm/K or substantially 4 ppm/K or exactly 4 ppm/K.

The solid 1 is preferably fixed to the cooling device 3, in particular adhered, in longitudinal direction with its underside 7, which is preferably located in longitudinal direction opposite to the surface 5. To generate the modifications 9, the laser beams are thus introduced into the solid 1 via the surface 5, which is part of the solid layer 12 to be cut off, in the direction of the cooling device 3.

Figure 9C:
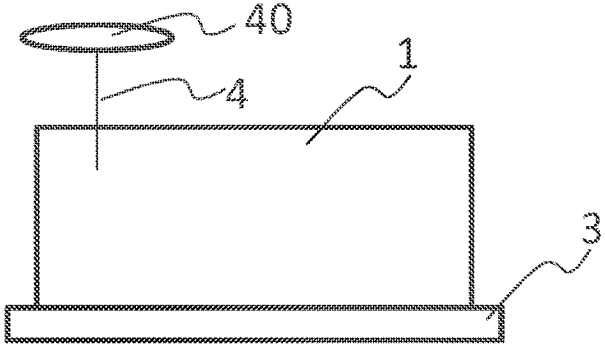

FIG. 9c shows the generation of the modifications 9 by means of the laser beams in a schematic manner. The cooling device 3 hereby effects that the energy or heat, respectively, introduced into the solid 1 by means of the laser beams, is at least partially and preferably predominantly discharged from the solid 1.

Figure 9D:
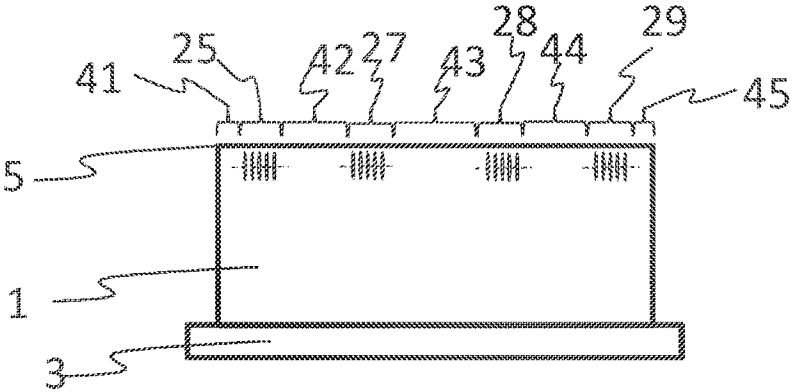

FIG. 9d shows a schematic sectional illustration of the solid 1 after the generation of the modifications 9. According to this example, 4 blocks of modifications 9 can be seen, which lead to the 4 crack portions 25, 27, 28, 29. Adjoining the blocks comprising modifications 9, reference numerals 41, 42, 43, 44 and 45 in each case identify zones without modifications 9, or zones, in which fewer modifications 9 are generated than in the zones, in which the blocks of modifications 9 are generated.

Figure 9E:
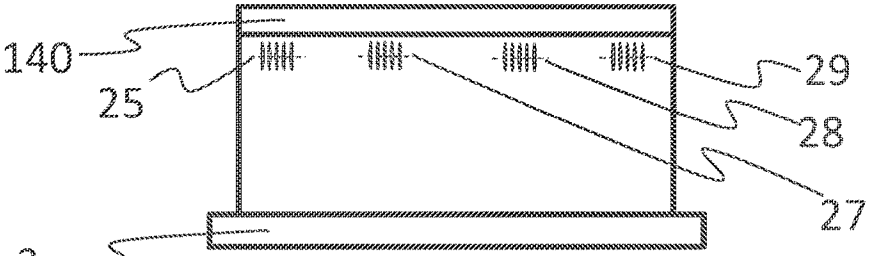

FIG. 9e shows a state, according to which a receiving layer 140, in particular having a polymer material, is arranged or generated on the surface 5, via which the laser beams have penetrated into the solid 1. The receiving layer 140 has preferably been created as film and has been adhered to the surface 5 after its creation. It is also possible, however, to embody the receiving layer 140 by applying a liquid polymer to the surface 5 and by subsequent solidification.

Figure 9F:
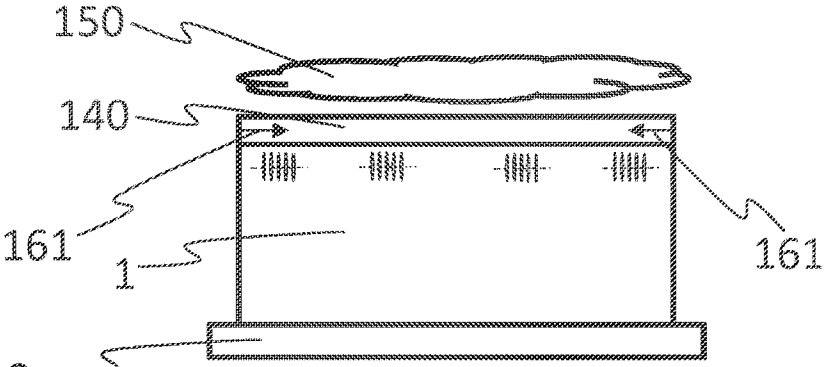

FIG. 9f shows a temperature control of the receiving layer 140 in a schematic manner. The temperature of the receiving layer 140 is preferably controlled, in particular cooled, to a temperature below the ambient temperature, in particular to a temperature of less than 20° C., or of less than 1° C. or of less than 0° C. or of less than −10° C. or of less than −50° C. or of less than −100° C. Wherein the material of the receiving layer 140 is subjected to a glass transition as a result of the cool-down. The temperature of the receiving layer 140 is preferably controlled by means of liquid nitrogen. Due to the temperature control, in particular due to the glass transition, the receiving layer 140 contracts, whereby mechanical stresses are created in the solid 1. Due to the mechanical stresses, a crack, which connects the crack portions 25, 27, 28, 29 and by means of which the solid portion 12 is cut off from the solid 1, is triggered.

FIG. 10a shows an illustration after the temperature control of the receiving layer 140 shown in FIG. 9f. The solid portion 12 is cut off from the solid 1 by means of the receiving layer 140, which is still arranged thereon.

FIG. 10b shows a new step of introducing modifications 9 into the remaining solid 1, which is reduced in its length by at least the already cut-off solid layer 12.

FIG. 10c shows a further preferred design in a schematic manner. The cooling device 3 is hereby coupled to the solid 1 on the one hand and is coupled to a displacement device 30 on the other hand, in particular an X/Y displacement device or a rotary table. The displacement device 30 effects a movement of the solid 1, whereby the latter can be moved in a defined manner with respect to the surrounding area and a laser optics, in particular a scanner.

FIG. 10d shows a further detailed schematic illustration of FIG. 10c. The round arrow inside the displacement device 30 identifies that the latter can be rotated. Provision is further made between the solid 1 and the cooling device 3 for a coupling layer, in particular an adhesive layer. The coupling layer 30 is hereby preferably embodied in such a way that it withstands a plurality of processing cylinders, in particular more than 200 or more than 300 or more than 500 processing cycles, at high mechanical and thermal stress. It can further be gathered from this illustration that the laser beam source 401 preferably guides laser beams along a first laser beam conductor 402 to an optics 40, from where the laser beams reach a scanner by means of a further laser beam conductor 403. In the alternative, however, it is also conceivable hereby that at least the laser beam source 401 and the scanner 400 are provided.

FIG. 11 shows the cooling device 3. The cooling device 3 preferably has a conducting-guiding structure, which is preferably formed by means of a tool carrier, in particular a chuck. The conducting-guiding structure preferably has a round basic shape. This is advantageous, because an imbalance can be avoided more easily with regard to spinning processes. The round basic shape is preferably further provided with flattened portions 95-98. These flattened portions are advantageous, because they allow or facilitate, respectively a coarse orientation and/or coffering.

The cooling device 3, in particular the conducting-guiding structure of the cooling device 3, preferably has a good thermal conductivity. The cooling device 3 preferably further has anodized aluminum, whereby abrasion particles are reduced or prevented, respectively. This is advantageous, because the clean room compatibility is increased through this. The chuck is preferably further compatible for the detaching process.

Provision is preferably further made for at least two aligning elements 65-68. The aligning elements 65-68 are preferably embodied as alignment holes or slits or pins. The aligning elements 65-68 preferably form actuators for the non-positive and/or positive rotation transfer. The aligning elements 65-68 preferably have steel or ceramic inserts, whereby a high wear resistance is attained. The aligning elements 65-68 preferably serve the purpose of coupling the cooling device 3 to the displacement device 30.

Provision can further be made for aligning pins, they can be embodied as holding-down devices, e.g., whereby e.g. a force and/or positive connection to the conducting-guiding structure can be created.

Provision is preferably furthermore made for a notch, groove or marking 76 on the cooling device 3. This feature is advantageous, because the solid orientation, in particular ingot orientation, can be seen through this. The knowledge about the orientation of the solid, in particular of the ingot, can be used in order to be able to adapt the modifications 9, which are generated by means of the laser beams, to the crystallographic orientation.

Reference numeral 75 identifies an optional data carrier element and/or data transfer element and/or data capturing element in a purely exemplary manner. The element identified with reference numeral 75 is preferably embodied as bar code and/or RFID element and/or SAW sensor. It in particular allows an integration into a manufacturing execution system (MES).

Cooling ducts for guiding a cooling fluid are preferably further provided or embodied, respectively on or in the conducting-guiding structure. The cooling duct or the cooling ducts 78 can serve the purpose of controlling the temperature of the solid 1, of the cooling device 3 and/or of a machine holder, in particular the displacement device 30. Cooling fluid, in particular a liquid, can be supplied into the cooling duct 78 via an inlet 77, and can be removed via an outlet 79. The boundary surface or the coupling layer, respectively, between solid 1 and cooling device 3 preferably has a high thermal conductivity, in particular according to the thermal conductivity of the solid 1 or of the cooling device 3. In addition or in the alternative, the cooling device 3 can be cooled via the air interface. In the case of high speeds or displacement speeds, respectively, of the displacement device 30, the air layer, which forms around the cooling device 3, is very thin, whereby heat can be discharged very well.

An active temperature control is preferably furthermore integrated into the MES. In addition or in the alternative, a process is monitored for different substrate sizes and thicknesses.

A sealing of the fluid ducts in the case of a fixed storage preferably takes place by means of pressing and, in the case of rotation, by means of a central annular seal, e.g.

Reference numeral 69 identifies an optional sensor device, which is preferably embodied as temperature sensor. Preferably, the sensor device is an SAW temperature sensor.

FIG. 12 shows the optics 40, 608, which is preferably used to generate the modifications 9. The method according to the invention thus preferably also comprises the step of providing an optics 40, 608, wherein the optics 608 preferably has at least two deflecting elements 610, 612 for deflecting light beam portions 616, 618. The light beams 616, 618 are preferably generated and emitted by the laser beam source 401. The method according to the invention further preferably comprises the step of deflecting at least two light beam portions 616, 618, which differ from one another, of the emitted light beam 606 by means of the deflecting elements 610, 612, 613, wherein the light beam portions 616, 618 are deflected in such a way that they penetrate into the solid 1 and wherein the deflected light beam portions 616, 618, which differ from one another, meet in a focus 620 inside the solid 1 and the physical modification 9, in particular in the form of a grid defect, is generated by means of the light beam portions 616, 618, which meet in the focus 620, or the step of generating and emitting at least two light beams 606 by means of the laser beam source or radiation source arrangement 401, respectively. The method according to the invention preferably further comprises the step of deflecting the light beams 606 by means of the deflecting elements 610, 612, 613, wherein the light beams 606 are deflected in such a way that they penetrate into the solid 1, and wherein the deflected light beams 606, which are different from one another, meet in a focus 620 inside the solid 1 and the physical modification 9, in particular in the form of a grid defect, is generated by means of the light beams (6), which meet in the focus 620.

It is additionally conceivable that at least two light beam portions 616, 618, which differ from one another, of at least one emitted light beam 606, in particular the light beam portions of a plurality of emitted light beams, or the plurality of emitted light beams 606 are deflected by means of the deflecting elements 610, 612, 613, wherein the light beam portions 616, 618 or the light beams 606 are deflected in such a way that they penetrate into the solid 1, and wherein the deflected light beam portions 616, 618, which differ from one another, meet in a focus 620 inside the solid 1, and the physical modification 9, in particular in the form of a grid defect, is generated by means of the light beam portions 616, 618 or light beams 606, which meet in the focus 620.

According to the method according to the invention, at least two light beams 606 and preferably all light beams 606 can be split into light beam portions 616, 618, which differ from one another, in particular cover different paths, and which penetrate into the solid 1 at surface portions 622, 624, which are spaced apart from one another, of the solid 1, in the case of a plurality of light beams 606, which are created synchronously, wherein the light beam portions 616, 186 of a respective light beam are deflected by means of deflecting elements 610, 612, 613, which differ from one another.

The optics 608 preferably has at least one light beam splitting means 633, in particular a half mirror or beam splitter, and at least one light beam 606 is split into at least two light beam portions 616, 618 by means of at least the light beam splitting means 633. A light beam 606 is preferably split into at least two light beam portions 616, 618 by means of a light beam splitting means 633, in particular a half mirror, wherein a light beam portion 616 is deflected by means of at least two deflecting elements 610, 612, 613, in particular mirrors, in such a way that it meets the other light beam portion 618 on the inside of the solid 1 in order to form a focus 620 for generating the physical modification 9. Particularly preferably, a plurality of physical modifications 9 is generated, wherein the physical modifications 9 preferably form or describe, respectively, a plane and/or a contour and/or a silhouette and/or the outer shape of a body.

The at least one light beam 606 emitted by the laser beam source 401 preferably consists of coherent light and the light waves of the light beam portions 616, 618, which meet in the focus 620, preferably have the same phase and the same frequency.

Particularly preferably, at least one light beam portion 616, 618 or at least one light beam 606 is deflected and focused by means of a deflecting element 610, 612, 613, which is embodied as parabolic mirror.

The at least one light beam portion 616, 618 or the at least one light beam 606 further preferably penetrates a deflecting element 610, 612, 613, in particular the parabolic mirror, a beam forming device, in particular a 1D telescope, in order to change the focus shape prior to the deflection and focusing.

The laser beam source 401 preferably generates at least one or exactly two light beams, wherein the light beams 606 are generated as a function of the band gap of the material of the solid 1 with different colors in such a way that the modification 9 is generated by means of a two-photon process.

A first laser field is preferably formed by means of a first light beam 606, wherein the first light beam 606 has photons comprising a first energy, and a second laser field is preferably formed by means of a second light beam 606, wherein the second laser beam 606 has photons comprising a second energy, wherein the first laser field is weaker than the second laser field and the first energy is larger than the second energy.

FIG. 13 shows the modification generation by means of two laser beams or two laser beam portions in a schematic illustration. The modifications 9 hereby preferably have a vertical expansion of less than 50 μm and preferably of less than 30 μm and particularly preferably of less than 20 μm.

The focus 620 is preferably spaced apart from a penetration surface 626 of the solid 1 by less than 1000 μm and preferably less than 500 μm and particularly preferably less than 200 μm, wherein at least individual light beam portions 616, 618 penetrate into the solid 1 via the penetration surface 626 in order to generate the physical modification 9.

The focus 620 is preferably generated in an overlapping portion of at least two intersecting light beam portions 630, 632, wherein the light beam portions 630, 632 are generated by means of the light beam portions 616, 618 or light beams 606.

What is thus described is a method for creating a detachment zone in a solid in order to detach a solid portion, especially a solid layer, from the solid, wherein the solid portion, which is to be detached, is thinner than the solid, from which the solid portion has been removed. The method according to the invention thereby preferably comprises at least the steps of: providing a solid, which is to be processed, wherein the solid is made of a chemical compound; providing a LASER light source; applying LASER radiation from the LASER light source to the solid, wherein the laser beams penetrate into the solid via a surface of the solid portion, which is to be cut off, wherein the LASER radiation controls the temperature of a predefined portion of the solid inside the solid in a defined manner such that a detachment zone or a plurality of partial detachment zones is formed, characterized in that the temperature produced by the laser beams in a predefined portion of the solid is so high that the material forming the predefined portion is subject to modifications in the form of a predetermined conversion of material.

What is further described is a method for creating a detachment zone in a solid in order to detach a solid portion from the solid, at least comprising the steps of: providing a solid, which is to be processed, wherein the solid is made of a chemical compound; providing a LASER light source, applying LASER radiation from the LASER light source to the solid, wherein the LASER radiation controls the temperature of a predefined portion of the solid inside the solid in a defined manner such that a detachment zone is formed, wherein the temperature produced in the predefined portion of the solid is so high that the material forming the predefined portion is subject to a predetermined conversion of material.

LIST OF REFERENCE NUMERALS

1 solid
2 detachment zone
4 laser beam
5 polished surface
6 laser beam in the solid
7 underside of the solid
8 focus
9 modification
10 first solid
11 solid layer
12 second solid
17 reference length
18 main surface
25 first crack portion
27 second crack portion
28 third crack portion
29 fourth crack portion
30 rotary table
31 crack between outer edge and first modification block
32 crack between two Modification blocks
33 crack between outer edge and first modification block and further modification block or outer edge
34 crack between modification block and outer edge
40 optics
41 first zone without modification block
42 second zone without modification block
43 third zone without modification block
44 fourth zone without modification block
45 fifth zone without modification block
51 unchanged material
52 unchanged material
53 Raman spectrum
54 intensity in %
56 wavelength in $cm^{-1}$
61 graph relating to unchanged material portion
62 graph relating to unchanged material portion
65 first aligning element
66 second aligning element
67 third aligning element
68 fourth alignment element
69 sensor means
75 data carrier element and/o data transfer element
76 groove
77 fluid inlet
78 fluid line
79 fluid outlet
80 conducting-guiding structure
71 first end of a crack portion
72 second end of a crack portion
91 first block of modifications
92 second block of modifications
112 second solid layer
113 third solid layer
140 receiving layer
150 temperature control fluid
161 deforming direction of the receiving layer
300 coupling layer
400 scanner
401 laser beam source
402 laser beam conductor
403 further laser beam conductor
501 exposed surface of the first solid layer
502 laser penetration surface of the second solid layer
503 exposed surface of the second solid layer
504 laser penetration surface of the third solid layer
505 exposed surface of the third solid layer
606 light beam
608 optics
610 first deflecting element
612 second deflecting element
613 third deflecting element
616 first light beam portion

618 second light beam portion
620 focus
622 first surface portion
624 second surface portion
630 light beam portion
632 light beam portion
901 first field without modifications
902 second field without modifications
903 third field without modifications

The invention claimed is:

1. A method, comprising:

directing laser light from a laser light source into a solid surface of a solid, the laser light controlling a temperature of a predefined portion of the solid, the temperature controlled by the laser light subjecting a material of the solid which forms the predefined portion to modifications which convert the material; and moving the solid in a translational manner with respect to the laser light source such that a number of the modifications per cm2 of the solid surface per translational movement, through which the laser light penetrates into the solid to generate the modifications, is below a predefined maximum number, wherein a maximum number of the modifications per cm2 and per the translational movement is determined as a function of the material and of an energy density of the laser light,

*wherein the number of generated modifications per cm$^2$ is different in at least two different zones of the solid,*

*wherein a first block of modifications is generated in a first zone and spaced apart from one another by less than 20 μm,*

*wherein a second block of modifications is generated in a second zone and spaced apart from one another by less than 20 μm,*

*wherein the first zone and the second zone are spaced apart from one another by a third zone,*

*wherein fewer modifications as compared to the first zone or the second zone per cm$^2$ are generated in the third zone by the laser light,*

*wherein the first zone is spaced apart from the second zone by more than 20 μm.*

2. The method of claim 1, wherein the material of the solid is selected from the group consisting of a third, fourth and/or fifth main group of the periodic table of elements and/or from the 12$^{th}$ subgroup of the periodic table of elements.

3. The method of claim 1, further comprising:

connecting the solid to a cooling device; and operating the cooling device during application of the laser light to the solid.

4. The method of claim 3, wherein the cooling device has at least one sensor device for capturing the temperature of the solid and, as a function of a predefined temperature course, effects a cool-down of the solid.

5. The method of claim 3, further comprising:

coupling the cooling device to a rotating means; and rotating the cooling device with the solid arranged thereon by the rotating means during generation of the modifications.

6. The method of claim 1, *wherein the solid is subjected to consecutive rotations with respect to the laser light source, and* wherein the modifications are generated with different patterns, in response to *the* consecutive rotations of the solid with respect to the laser light source.

7. The method of claim 1, wherein the laser light source is a laser light scanner, and wherein generation of the modifications is a function of a laser scanning direction of the laser light scanner, a laser polarization direction and crystal orientation of the material of the solid.

8. The method of claim 1, wherein a distance between centers of two modifications, which are generated consecutively in a modification generating direction or in a circumferential direction of the solid, is less than 10000 nm.

9. The method of claim 1, wherein an outer limitation of the modifications, which are generated consecutively in a modification generating direction or in a circumferential direction of the solid, are spaced apart from one another by less than 10000 nm.

[10. The method of claim 1, wherein the number of generated modifications per cm$^2$ is different in at least two different zones of the solid, wherein a first block of modifications is generated in a first zone and spaced apart from one another by less than 20 μm, wherein a second block of modifications is generated in a second zone and spaced apart from one another by less than 20 μm, wherein the first zone and the second zone are spaced apart from one another by a third zone, wherein fewer modification as compared to the first zone or the second zone per cm$^2$ are generated in the third zone by the laser light, and wherein the first zone is spaced apart from the second zone by more than 20 μm.]

11. The method of claim [10] *1*, further comprising:

generating the modifications at least in the first block of modifications and in the second block of modifications in pulse intervals of between 0.01 μm and 10 μm.

12. The method of claim [10] *1*, further comprising:

generating the modifications at least in the first block of modifications and in the second block of modifications in line spacings of between 0.01 μm and 20 μm.

13. The method of claim [10] *1*, further comprising:

generating the modifications at least in the first block of modifications and in the second block of modifications at a pulse repetition frequency of between 16 kHz and 20 MHz.

14. The method of claim 1, further comprising:

providing an optics for guiding the laser light from the laser light source to the solid; and adapting the optics as a function of a location at which a modification is generated, from which at least one change of a numerical aperture of the optics is effected, wherein the numerical aperture at a location in an edge zone of the solid is smaller than at a different location of the solid, which is located closer to a center of the solid.

15. A method, comprising:

directing laser light from a laser light source into a solid surface of a solid, the laser light controlling a temperature of a predefined portion of the solid such that a detachment zone is formed in the solid, the temperature controlled by the laser light subjecting a material of the solid which forms the predefined portion to modifications which convert the material;

*connecting the solid to a cooling device;*

*operating the cooling device during application of the laser light to the solid;* expanding a crack in the solid along the detachment zone to separate a solid portion from the solid along the crack; and after the solid portion separates from the solid along the crack, again directing laser light from the laser light source into the solid to control the temperature of an additional predefined portion of the solid such that an additional detachment zone is formed, the temperature subjecting a material of the additional predefined portion of the solid to a predetermined material conversion.

[16. The method of claim 15, further comprising:

connecting the solid to a cooling device; and operating the cooling device during application of the laser light to the solid.]

17. The method of claim [16] *15*, wherein the cooling device has at least one sensor device for capturing the temperature of the solid and, as a function of a predefined temperature course, effects a cool-down of the solid.

18. The method of claim [16] *15*, further comprising:

coupling the cooling device to a rotating means; and rotating the cooling device with the solid arranged thereon by the rotating means during generation of the modifications.

19. A method, comprising:

directing laser light from a laser light source into a solid surface of a solid, the laser light controlling a temperature of a predefined portion of the solid, the temperature controlled by the laser light subjecting a material of the solid which forms the predefined portion to modifications which convert the material;

*connecting the solid to a cooling device;*

*operating the cooling device during application of the laser light to the solid;* and rotating or moving the solid in a translational manner with respect to the laser light source, wherein a distance between centers of two modifications which are generated consecutively in a modification generating direction or in a circumferential direction of the solid is less than 10000 nm, and/or an outer limitation of the modifications which are generated consecutively in the modification generating direction or in the circumferential direction of the solid are spaced apart from one another by less than 10000 nm.

20. The method of claim 19, wherein the material of the solid is selected from the group consisting of a third, fourth and/or fifth main group of the periodic table of elements and/or from the $12^{th}$ subgroup of the periodic table of elements.

[21. The method of claim 19, further comprising:

connecting the solid to a cooling device; and operating the cooling device during application of the laser light to the solid.]

22. The method of claim [21] *19*, wherein the cooling device has at least one sensor device for capturing the temperature of the solid and, as a function of a predefined temperature course, effects a cool-down of the solid.

23. The method of claim [21] *19*, further comprising:

coupling the cooling device to a rotating means; and rotating the cooling device with the solid arranged thereon by the rotating means during generation of the modifications.

24. The method of claim 19, *wherein the solid is subjected to consecutive rotations with respect to the laser light source, and* wherein the modifications are generated with different patterns, in response to *the* consecutive rotations of the solid with respect to the laser light source.

25. The method of claim 19, wherein the laser light source is a laser light scanner, and wherein generation of the modifications is a function of a laser scanning direction of the laser light scanner, a laser polarization direction and crystal orientation of the material of the solid.

26. The method of claim 19, further comprising:

providing an optics for guiding the laser light from the laser light source to the solid; and adapting the optics as a function of a location at which a modification is generated, from which at least one change of a numerical aperture of the optics is effected, wherein the numerical aperture at a location in an edge zone of the solid is smaller than at a different location of the solid, which is located closer to a center of the solid.

*27. A method for separating a solid portion, in particular a wafer, from a solid, comprising:*

*providing a solid to be processed, wherein the solid consists of silicon carbide;*

*exposing the solid to laser radiation from a laser light source, wherein*

*the laser radiation penetrates the solid body via a surface of the solid portion to be separated;*

*the laser radiation controls the temperature of a predetermined portion of the solid inside the solid in a defined manner to form a detachment region or a plurality of partial detachment regions; and*

*the temperature produced in the predetermined portion of the solid by the laser radiation is so high that the material forming the predetermined portion is subject to modifications in the form of a predetermined material conversion or a phase conversion, the modifications creating a detachment region; and*

*separating the solid portion from the solid along the detachment region, the solid portion being thinner than the remaining solid reduced by the solid portion,*

*wherein the modifications are in the form of a predetermined material conversion comprising a decomposition of silicon carbide into its individual elements.*

*28. The method of claim 27, wherein separating the solid portion comprises introducing a force into the solid.*

*29. The method of claim 27, wherein the modifications each have a vertical extent of less than 30 μm.*

*30. The method of claim 27, wherein the modifications are in the form of a phase transformation, and the resulting phases are silicon and diamond-like carbon phases.*

*31. The method of claim 27, wherein the solid in the region of the modifications has a reduced stability compared to the solid outside the modifications.*

*32. The method of claim 27, wherein the temperature produced by the laser radiation is at least 2790° C.*

*33. The method of claim 27, wherein:*

*in at least two different regions of the solid, the number of modifications generated per $cm^2$ is different;*

*a first block of modification lines is generated in a first region, wherein the individual modifications per line are generated at a distance of less than 10 μm from each other, the individual lines of the first block being generated less than 20 μm apart from one another, wherein a first partial detachment region is formed by the first block of modifications;*

*a second block of modification lines is generated in a second region, wherein the individual modifications per line are generated at a distance less than 10 μm apart from one another, the individual lines of the second block being generated less than 20 μm apart from one another, wherein a second partial detachment region is formed by the second block of modifications; and*

*the first region and the second region are spaced apart by a third region, wherein there are no modifications in the third region or there are fewer modifications per $cm^2$ generated by the laser radiation in the third region*

*compared to the first or second region, and the first region is spaced apart from the second region by more than 20 μm.*

*34. The method of claim 33, wherein the modifications are generated by the laser radiation at least in the first block and in the second block at a pulse repetition frequency between 16 kHz and 20 MHZ.*

*35. The method of claim 27, wherein the laser light source is a laser light scanner, and wherein generation of the modifications is a function of a laser scanning direction of the laser light scanner, a laser polarization direction and crystal orientation of the material of the solid.*

*36. The method of claim 27, further comprising:*

*providing an optics for guiding the laser light from the laser light source to the solid; and*

*adapting the optics as a function of a location at which a modification is generated, from which at least one change of a numerical aperture of the optics is effected, wherein the numerical aperture at a location in an edge zone of the solid is smaller than at a different location of the solid, which is located closer to a center of the solid.*

*37. The method of claim 27, wherein separating the solid portion comprises:*

*arranging a receiving layer on the solid; and*

*applying a thermal application on the receiving layer to mechanically generate crack propagation stresses in the solid, wherein the crack propagation stresses cause a crack to propagate in the solid along the detachment region.*

*38. The method of claim 37, wherein the thermal application comprises cooling the receiving layer below a glass transition temperature of the material of the receiving layer.*

*39. The method of claim 27, wherein the solid is at least partially transparent for the laser radiation.*

*40. The method of claim 27, wherein the laser radiation is pulsed laser radiation with a wavelength of between 800 nm and 1200 nm.*

*41. A method, comprising:*

*directing laser light from a laser light source into a solid surface of a solid, the laser light controlling a temperature of a predefined portion of the solid such that a detachment zone is formed in the solid, the temperature controlled by the laser light subjecting a material of the solid which forms the predefined portion to modifications which convert the material;*

*expanding a crack in the solid along the detachment zone to separate a solid portion from the solid along the crack; and*

*after the solid portion separates from the solid along the crack, again directing laser light from the laser light source into the solid to control the temperature of an additional predefined portion of the solid such that an additional detachment zone is formed, the temperature subjecting a material of the additional predefined portion of the solid to a predetermined material conversion,*

*wherein the modifications are in the form of a predetermined material conversion comprising a decomposition of silicon carbide into its individual elements.*

*42. The method of claim 41, wherein the modifications are in the form of a phase transformation, and the resulting phases are silicon and diamond-like carbon phases.*

*43. The method of claim 41, wherein the solid is at least partially transparent for the laser light.*

*44. The method of claim 41, wherein the laser light is pulsed laser radiation with a wavelength of between 800 nm and 1200 nm.*

*45. A method, comprising:*

*directing laser light from a laser light source into a solid surface of a solid, the laser light controlling a temperature of a predefined portion of the solid, the temperature controlled by the laser light subjecting a material of the solid which forms the predefined portion to modifications which convert the material; and*

*rotating or moving the solid in a translational manner with respect to the laser light source,*

*wherein a distance between centers of two modifications which are generated consecutively in a modification generating direction or in a circumferential direction of the solid is less than 10000 nm, and/or an outer limitation of the modifications which are generated consecutively in the modification generating direction or in the circumferential direction of the solid are spaced apart from one another by less than 10000 nm,*

*wherein the modifications are in the form of a predetermined material conversion comprising a decomposition of silicon carbide into its individual elements.*

*46. The method of claim 45, wherein the modifications are in the form of a phase transformation, and the resulting phases are silicon and diamond-like carbon phases.*

*47. A method for separating a solid portion, in particular a wafer, from a solid, comprising:*

*providing a solid to be processed, wherein a material of the solid is silicon carbide or gallium nitride;*

*exposing the solid to laser radiation from a laser light source, wherein*

*the laser radiation penetrates the solid body via a surface of the solid portion to be separated;*

*the laser radiation controls the temperature of a predetermined portion of the solid inside the solid in a defined manner to form a detachment region or a plurality of partial detachment regions; and*

*the temperature produced in the predetermined portion of the solid by the laser radiation is so high that the material forming the predetermined portion is subject to modifications in the form of a predetermined material conversion or a phase conversion, the modifications creating a detachment region; and*

*separating the solid portion from the solid along the detachment region, the solid portion being thinner than the remaining solid reduced by the solid portion,*

*wherein the temperature produced by the laser radiation is at least 2790° C.*

*48. The method of claim 47, wherein the solid is at least partially transparent for the laser radiation.*

*49. The method of claim 47, wherein the laser radiation is pulsed laser radiation with a wavelength of between 800 nm and 1200 nm.*

* * * * *